United States Patent

[11] 3,587,044

[72] Inventor Harold E. Jenkins
Los Gatos, Calif.
[21] Appl. No. 841,633
[22] Filed July 14, 1969
[45] Patented June 22, 1971
[73] Assignee International Business Machines Corporation
Armonk, N.Y.

[54] DIGITAL COMMUNICATION SYSTEM

9 Claims, 13 Drawing Figs.

[52] U.S. Cl. .......... 340/146.1, 235/153, 340/172.5
[51] Int. Cl. .......... G06f 11/00, G08c 25/02
[50] Field of Search .......... 340/146.1, 172.5; 235/153; 178/23.1, 69.5

[56] References Cited

UNITED STATES PATENTS

| | | | |
|---|---|---|---|
| 3,392,371 | 7/1968 | Sourgens | 340/146.1 |
| 3,452,330 | 6/1969 | Avery | 340/146.1 X |
| 3,453,592 | 7/1969 | Yoshiteru Ishii et al. | 340/146.1 |
| 3,456,239 | 7/1969 | Glasson | 340/146.1 |
| 3,462,550 | 8/1969 | Van Dalen | 340/146.1 X |

*Primary Examiner*—Malcolm A. Morrison
*Assistant Examiner*—Charles E. Atkinson
*Attorneys*—Hanifin and Jancin and John H. Holcombe

ABSTRACT: System for the transfer of data through a medium having a significant delay and for interlocking the data transfers to assure accurate completion thereof. A transmission means transmits data as a string of blocks to a receiving means. A first signal is separately transmitted to the receiving means each time a block of data is transmitted. At the receiving means, a second signal is generated upon coincident detection of receipt of a first signal and a block of data. The second signal is then transmitted back to the transmission means. At the transmission means, a delay means is set to count machine cycles to a predetermined time after the first signal is transmitted. The delay means then enables response circuitry of expect receipt of a second signal in the following machine cycle, the signals continuing at the machine cycle rate. Another counter is set to the number of blocks of data to be sent and decrements as each second signal is received. When the value of the second counter is equal to that of the delay counter, no more data is transmitted and the remaining received second signals are checked. If the counter is decremented thereby to zero and no more second signals are received at the transmission means, the correct amount of data was received by the receiving means.

INVENTOR
HAROLD E. JENKINS

BY John H. Holcombe

ATTORNEY

DIGITAL COMMUNICATION SYSTEM

BACKGROUND OF THE INVENTION

1. Field of the Invention

The invention relates to data transfer control apparatus and more particularly to such apparatus for controlling the transfer between two data handling devices such as a digital computer and associated peripheral equipment.

2. Description of the Prior Art

Previously, the time required for data to be physically transmitted from one data machine to another was not a significant factor in the operation thereof. The previous primary interest in the transfer of data between such data machines was to assure that all of the data involved in a data transfer was in fact transferred and received. To provide this assurance, the previous systems would, for example, completely interlock operation while the data is transferred. To accomplish the exemplified transfer of data between a central processing unit and a control unit for a peripheral storage device, the control unit first transmits to the central processing unit a special "service in" signal. This signals the CPU that a peripheral device wants to transmit or receive a byte of information. A byte may be, for example, eight binary bits of information arranged to be transmitted in parallel via an eight-wire cable. The CPU responds to the service in signal by accepting the byte of information on an input cable or has provided on an output cable a byte of data as requested by the service in. The CPU then transmits a special "service out" signal to the control unit thereby to signal that the byte of information was accepted or supplied. The service in signal from the control unit remains activated until such time as the corresponding service out signal is received. Then, the control unit drops the service in signal, thereby causing the CPU to drop the service out signal. The control unit then proceeds to the next byte of data and again transmits a service in signal to the CPU.

As the data rate, or the rate at which data is made available for transmission, becomes higher, the time required for transmission between the devices becomes a significant factor in hampering the operation thereof. For example, a length of time equal to two machine cycles may be required for transmission of a byte of data over a cable between the control unit and the CPU. Hence, the first byte of data would be placed by the device in the control unit, whereupon the control unit transmits the service in signal and the parallel byte of data to the CPU. Two machine cycles later, the CPU would receive the byte of data and provide the service out signal. Two machine cycles later, the service out signal would be received by the control unit. Only at this time would the control unit drop the service in signal and begin the required operation to transmit the next byte of data to the CPU. However, four machine cycles have passed, meaning that the data storage device is in position to supply the fifth subsequent byte of data, skipping the four intermediate bytes. In order to transmit the second byte of data, the control unit must therefore wait until the storage device completes one complete cycle and is ready to transmit the second byte of data.

Transmission of a string of bytes of data may alternatively be accomplished by a continuous interconnection between the data machines without providing a means for assuring that each byte of the data has been transferred.

SUMMARY OF THE INVENTION

It is therefore an object of the present invention to provide a system for transferring data across a medium having a significant delay compared to the data transfer rate and interlocking the data transfers to assure accurate completion thereof.

Briefly, the invention comprises a transmission means for transmitting data in a string of blocks to a receiving means. A signal means is associated with the transmission means for separately transmitting a first signal to the receiving means each time a block of data is transmitted by the transmission means. At the receiving means a response means is provided for detecting the reception of each of the first signals at the same time as the receipt of a block of data and transmitting a second signal in response thereto. At the transmission means, a delay means is provided having a predetermined delay equal to the delay between transmission of a first signal and reception of a corresponding second signal for checking the number and timing of blocks of data transmitted in a continuous sequence with the number and timing of the corresponding second signals received in the sequence.

DESCRIPTION OF THE PREFERRED EMBODIMENT

Figure 1:
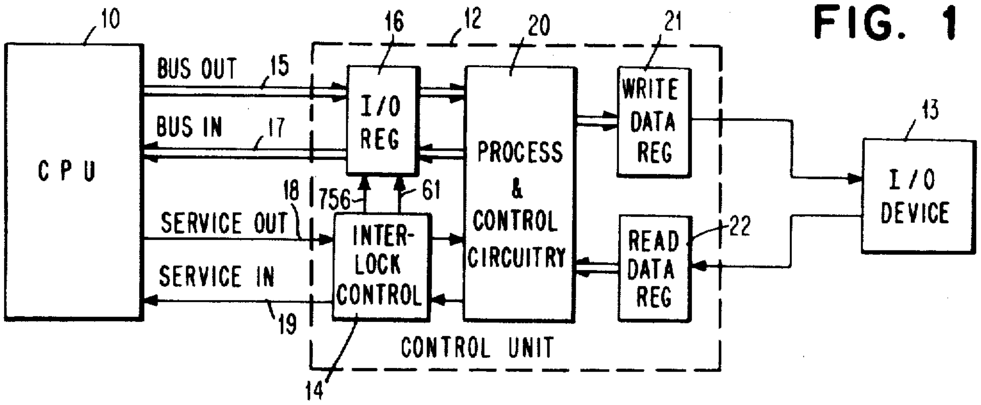
FIG. 1 is a diagrammatic illustration of a central processing unit, a control unit and an input-output device, wherein the present invention is employed.

Referring to FIG. 1, a central processing unit 10 is illustrated connected to a control unit 12, which is in turn connected to an input-output device 13. An exemplary central processing unit and control unit, together with the connections therebetween and operation thereof to accomplish the control of an input-output device and the transfer of data between the CPU and the control unit are all described in detail in U.S. Pat. 3,377,619, E. R. Marsh et al. issued Apr. 9, 1968, Class 340-172.5, assigned in common with the present invention. An example of the control unit and an input-output device connected thereto are also described in detail in copending Pat. application Ser. No. 604,876, J. J. Harmon, filed Dec. 27, 1966, now Pat. No. 3,544,966 issued Dec. 1, 1970 and assigned in common with the present invention. The only change thereover comprises the interlock control 14 and its operation with respect to CPU 10. The prior art method of controlling and interlocking the transfer of data between the CPU and the control unit is described briefly in the above Marsh et al. patent at Col. 14, lines 8—18.

In the present invention, data is transferred from the CPU to the control unit as a parallel byte, comprising a plurality of binary bits, over a parallel cable 15, called "bus out." In the control unit, bus out 15 is connected to input-output register 16. Data is transferred from the control unit to the CPU over a similar cable 17 connected to the input-output register and called "bus in." Two individual lines also connected between the CPU and the control unit which are pertinent to the present invention, are "service out" line 18 and "service in" line 19. The input-output register 16 is connected to processing control circuitry 20 which includes most of the circuitry described in the above-cited Harmon application. The processing control circuitry 20 is also connected to interlock control 14 and to write data register data 21 and a read data register 22. The write data register 21 is connected to the input-output device 13, as is the read data register. Many additional control lines interconnect the CPU with the control unit and the control unit with the input-output device and are described in the above-cited patent and application, but they are not pertinent to the present invention.

In operation, the CPU 10 may select a particular control unit and I/O device for communication therewith. For either reading or writing, data is transferred in separate, parallel bytes between the CPU and the control unit, and serially by byte between the control unit and the I/O device. Hence, input-output register 16 of the control unit operates in parallel, either receiving or transmitting a parallel byte of data with respect to the CPU, and in turn transmitting or receiving each such byte of data with respect to processing control circuitry 20 of the control unit. Each such byte of data is also transferred between the process and control circuitry and either write data register 21 or read data register 22 in parallel. Write data register 21 converts a parallel byte of data into serial form by storing the parallel byte and gating the byte to I/O device 13 serially one bit at a time. The I/O device likewise transmits a byte of data serially to read data register 22 which stores each bit as received in sequentially gated bit positions of the register. When an entire byte has been received, the read data register transmits the byte to process and control circuitry 20.

Unlike the prior systems, a control unit having an interlock control in accordance with the present invention need not be located closely adjacent CPU 10. Rather, the cables comprising bus out 15 and bus in 17 and the wires comprising service out line 18 and service in line 19 may be of an extended length. At an extended length, the time for transmission of data between the CPU and control unit and the time required for interchange of service in and service out signals on lines 18 and 19 may be significantly longer than a single data cycle of the control unit at the desired data transfer rate.

Briefly, data is transmitted from the control unit to the CPU by the input-output register 16 gating a parallel byte of data out onto cable 17. Interlock control 14 transmits a service in pulse on line 19 at the same time. The interlock control 14 terminates terminates the service in signal after a predetermined time and similarly causes I/O register 16 to terminate the transmission of the byte of data on cable 17. In accordance with a predetermined data transfer rate, the interlock control again transmits a service in signal on line 19 and again causes I/O register 16 to transmit the next sequential parallel byte of data on cable 17. After transmission of one or more service ins and the corresponding data, the first service in and data byte appear at CPU 10. The CPU recognizes the service in as indicating that a byte of data is available at the bus in input. The CPU then gates in this byte of data and transmits a service out pulse on line 18 to the control unit. Additional service ins and accompanying data may have been transmitted by the control unit by the time that the service out pulse reaches interlock control 14. The CPU transmits a separate service out pulse for each service in and corresponding byte of data received. Hence, a plurality of service ins and service outs may simultaneously appear along lines 18 and 19. The total time delay between transmission from the interlock control of a service in and receipt thereat of the corresponding service out is known. A delay means in the interlock control is set to count the machine cycles for a predetermined time comprising this delay. This delay means enables response circuitry to expect receipt of a service out pulse in the next following machine cycle, the receipt of service outs then continuing at the data transfer rate. The total number of bytes of data to be transmitted is known as the transfer begins. Another counter in the interlock control is set to this number and decrements as each service out signal, gated by the delay means, is received. Thus, when the value of the second counter is equal to that of the delay counter, no more data is transmitted. Then, all remaining service outs are checked, and the second counter continued to be decremented thereby. If the second counter is thus decremented to zero and no more service outs are received, the correct amount of data was transmitted to and received by the CPU 10.

Referring to FIGS. 2—12, the specific circuitry comprising interlock control 14 is shown. Nearly all transistor or integrated circuit logic today employs alternating positive and negative logic. By this is meant that if the inputs to a circuit are positive to cause the proper action, the proper action at the output is represented as a negative, and vice versa. Each of the circuits therefore will be designated as "plus" or "minus," indicating the sign of the input signals required to accomplish the action indicated by the circuit designation, such as "+OR" or "−AND."

Figure 12:
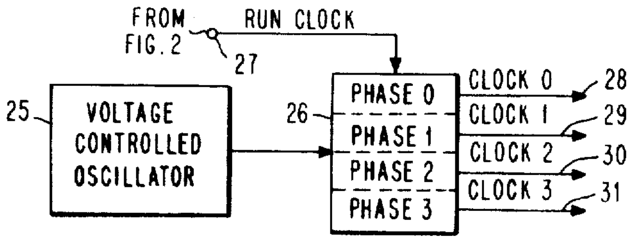

FIG. 12 illustrates a clock which may be employed to provide the timing and drive the circuitry of FIGS. 2—11. The clock includes a voltage controlled oscillator 25 and a counter-divider 26. An example of a voltage controlled oscillator which may be employed herein is described in detail in copending Pat. application Ser. No. 735,137, D. E. Anderson et al., filed June 6, 1968, and assigned in common with the present invention. Counter-divider 26 comprises an ordinary ring counter having eight stages. The first two stages of counter-divider 26 comprise phase 0, the second two stages comprise phase 1, the fifth and sixth stages comprise phase 2, and the last two stages comprise phase 3. A "Run Clock" input 27 is connected to the counter-divider. A negative signal thereat prevents the counter from running and holds it at the first stage. Applying a positive signal allows the VCO 25 to then run the counter-divider. Hence, a pulse appears at clock zero output 28 for the first two cycles of oscillator 25, a pulse appears at clock 1 output 29 for the next two cycles of oscillator 25, a pulse appears at clock 2 output 30 for the fifth and sixth cycles of oscillator 25, and a pulse appears on clock 3 output 31 for the seventh and eighth cycles of oscillator 25. The ring counter then returns to phase 0, producing an output pulse at clock zero output 28 for the next two cycles of oscillator 25, etc.

Figure 2:
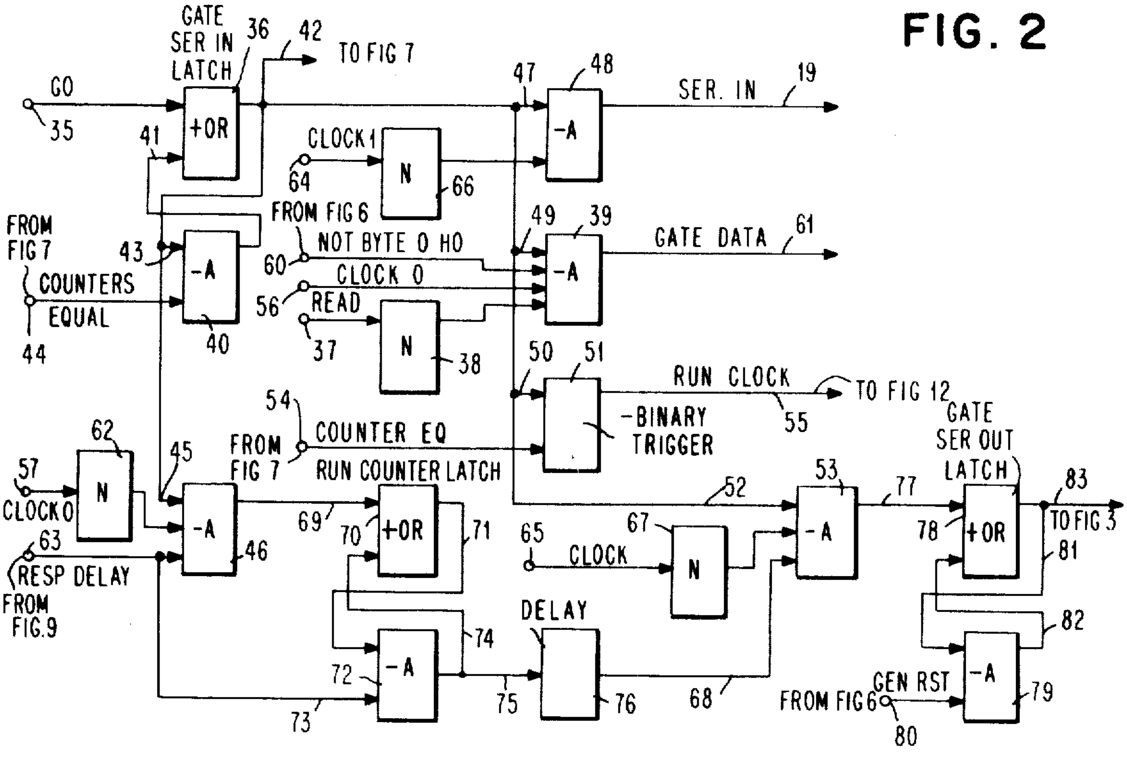
FIGS. 2—12 are detailed logic diagrams of the circuitry comprising an interlocking control constructed in accordance with the present invention.

Referring now to FIG. 2, the circuitry of interlock control 14 of FIG. 1 for transmitting the Service In signals on line 19 and for gating in the expected Service Out signals from line 18 are illustrated. The process and control circuitry 20 of FIG. 1 signals to the interlock control 14 whether data is to be transmitted or received with respect to the CPU and also signals the time that transfer is to begin. Additionally, the process and control circuitry signals the number of bytes of data to be transferred.

The signal indicating that data is to be transferred is received at "Go" input terminal 35. This signal is a positive pulse which is supplied to +OR circuit 36. The signal indicating that the data to be transferred is to be transmitted from the control unit to the CPU is represented by an input pulse appearing at "Read" input terminal 37. Since this input pulse is also positive, it is supplied to NOT circuit 38. The NOT circuit merely transmits the pulse after inverting its polarity. The resultant negative pulse is transmitted to −AND circuit 39. AND circuit 39 responds only to the presence of negative signals at all of its four inputs in order to supply a positive output signal, constituting the AND function. Otherwise, upon any of the inputs thereto being positive, the output of AND circuit 39 is negative. Hence, application of the Read input signal at terminal 37 enables one of the inputs to AND circuit 39. This signal occurs before application of the Go pulse at input 35 and continues until after all of the data has been properly transferred to the CPU.

OR circuit 36 and an AND circuit 40 are interconnected so that they together comprise a latch circuit. OR circuit 36 is a +OR circuit, which means that it performs the ORing function by responding to a positive input signal either from input terminal 35 or on line 41 to provide a negative output signal. AND circuit 40 is a negative AND, meaning that it responds to the application of negative input signals at both input line 43 and from input terminal 44 to provide a positive output signal on line 41. Input terminal 44 comprises "Counters Equal" input from FIG. 9, which normally is a negative signal, thereby enabling the AND circuit 40 to respond to a subsequently appearing negative signal at input 43. Application of the Go input signal at input terminal 35 operates OR circuit 36 to thereby supply a negative output signal. This negative signal is supplied, inter alia, to input line 43 of AND circuit 40. This signal, together with the enabling signal from input 44, operates AND circuit 40 to supply a positive output on line 41. This positive output is now employed by the OR circuit 36 to maintain the negative output. Hence, OR circuit 36 and AND circuit 40 are latched to continue supplying the negative signal until such time as an input from terminal 44 goes positive. The positive pulse appearing at input 35 subsequently terminates, but OR circuit 36 remains on due to the latching effect.

The latched negative output of OR circuit 36 is applied additionally to input 45 of −AND circuit 46, input 47 of −AND circuit 48, input 49 of AND circuit 39, input 50 of −Binary Trigger 51 and input 52 of −AND circuit 53.

Figure 6:
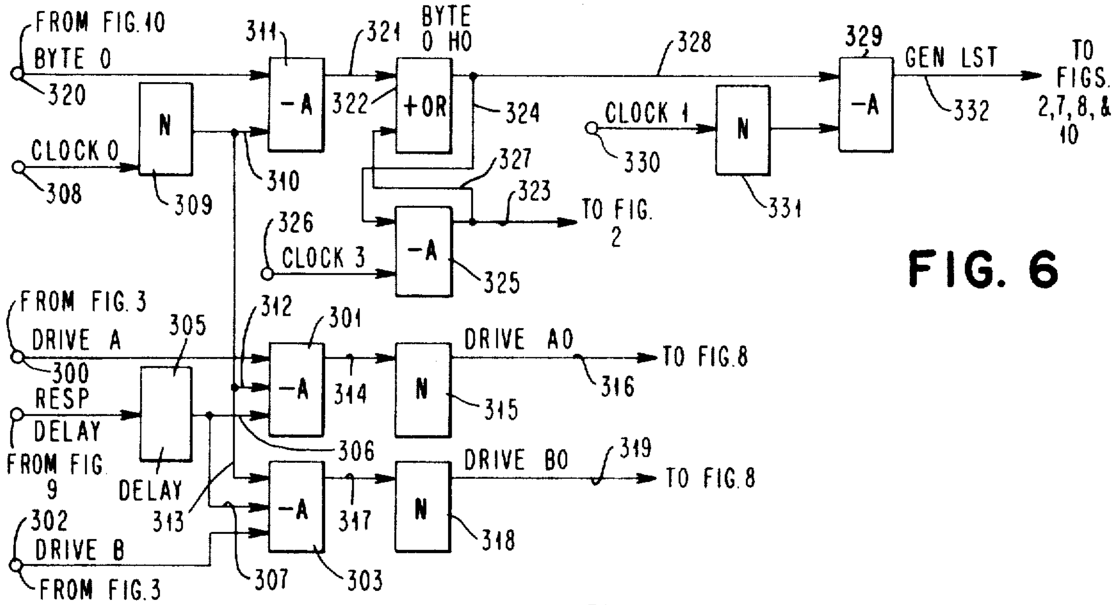

Binary Trigger 51 comprises a negative binary trigger which responds to a positive-to-negative transition at input 50 from OR circuit 36 by assuming the positive state and to a positive-to-negative transition at "Counters-Equal" input 54 from FIG. 6 by assuming the negative state. In the negative state, the trigger supplies a negative output signal on "Run Clock" output line 55. The Counters Equal input at terminal 54 is initially negative, having previously switched the trigger to the negative state. Hence, the trigger 51 initially supplies a negative output on Run Clock line 55. This output line is connected to input terminal 27 of FIG. 12. So long as this signal is negative, counter-divider 26 will not run.

Upon application of the Go input pulse at terminal 35 to OR circuit 36, that OR circuit transmits a negative signal to input 50 of trigger 51. Hence, the trigger switches to the positive state, causing a positive output signal to appear on line 55 to terminal 37 of FIG. 11. This positive signal causes the divider-counter 26 to begin cycling from its initial condition.

Figure 11:
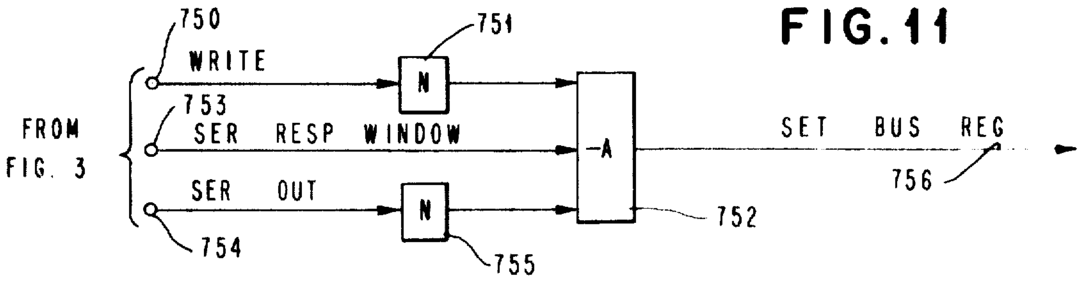

The clock 0 output pulse from the clock on line 28 in FIG. 11 is applied to input terminals 56 and 57 in FIG. 2. The clock 0 pulse at terminal 56 is a positive pulse which is directly supplied to input 59 of AND circuit 39, the input to the AND circuit being negative and enabling it for the other three phases of the clock. The remaining input to AND circuit 39 comprises the "NOT Byte Zero HO" input at terminal 60 from FIG. 5. This input is also negative and, when taken together with the negative input from NOT circuit 38 and on input 49 from OR circuit 36, the negative signals on input 59 at other than clock 0 time thereby operates AND circuit 39 to provide a positive pulse on "Gate Data" output line 61 of duration equal to three phases of the clock. This pulse is supplied on line 61 to input-output register 16 of the control unit shown in FIG. 1. This pulse signals the input output register to transmit the byte of data stored thereat onto Bus In cable 17 to the CPU 10.

The positive clock 0 pulse applied at input 57 is inverted by NOT circuit 62 and applied to negative AND circuit 46. As previously explained, a negative signal is continuously applied to input 45 of the AND circuit by OR circuit 36. The remaining input 63 to the AND circuit, the "Response Delay" input, is initially positive; hence, this input signal prevents AND circuit 46 from operating.

As the clock 0 input pulse is terminated, the Gate Data output on line 61 is terminated and the clock 1 input pulse then appears on output terminal 29 of the clock of FIG. 11. This pulse is applied at inputs 64 and 65 of FIG. 2. The pulse at terminal 64 is applied to NOT circuit 66 and inverted thereby for application to an input of AND circuit 48. Since the other input to the AND circuit is latched negative by the output of OR circuit 36, the application of the clock pulse thereto causes the AND circuit to operate and thereby supply a service in pulse on output line 19 to the CPU. The AND circuit is thus operated once each cycle of the counter-divider 26 of FIG. 11 so long as the Gate Service In OR circuit 36 is latched, each service in pulse being of duration equal to the duration of the phase 1 clock pulse.

The phase 1 clock pulse is also applied at input 65 to NOT circuit 67. That circuit inverts the clock pulse and applies it to AND circuit 53. The input at line 52 to the AND circuit is also negative as previously described; however, the other input on line 68 to the AND circuit is initially held positive, as will be explained hereinafter, thereby preventing operation of the circuit.

After a predetermined time from the initiation of the Run Clock signal on output line 55, the positive signal appearing at Response Delay input terminal 63 of FIG. 2 becomes negative, as will be explained hereinafter. This negative signal is thus applied as an input to AND circuit 46. Input 45 to the AND circuit is also negative as a result of the output of the latched OR circuit 36. Hence, at the subsequently appearing phase 0 of the clock, a positive pulse is provided at input terminal 57 to NOT circuit 62. This circuit inverts the signal, thereby applying a negative input to the AND circuit. This negative signal operates the AND circuit for the duration of the phase 0 pulse. This output is a positive pulse and appears on line 69 as an input to +OR circuit 70. The OR circuit therefore supplies a negative output on line 71 to −AND circuit 72. The other input to the AND circuit is on line 73 and comprises the now negative signal from Response Delay input terminal 63. Therefore, AND circuit 72 operates by supplying a positive output on line 74 to the OR circuit 70, thereby latching the OR circuit until such time as the input on line 73 to the AND circuit again goes positive. As a result of this latched condition, the AND circuit supplies a continuous positive output signal on line 75 to delay circuit 76. The delay circuit includes normal resistance-capacitance means for inverting and delaying the positive signal on line 75 for approximately three phases of the clock. Hence, a positive signal appearing on line 75 at phase 0 of the clock is delayed until approximately phase 3 of the clock. At this time, a continuing negative signal is supplied by the delay 76 on line 68 to AND circuit 53. This negative signal will continue to appear on line 68 until the latched output of AND circuit 72 turns off.

At phase 1 of the clock in the following cycle thereof, a positive signal appears at input 65 to NOT circuit 67. This circuit inverts the signal, thereby applying a negative input to AND circuit 53. Input 52 thereto has already been latched negative by the output of OR circuit 36. Hence, at this subsequent phase 1, the AND circuit 53 operates to provide a positive output for the duration of the phase 1 clock pulse on output line 77 to +OR circuit 78.

OR circuit 78 and −AND circuit 79 comprise another latch circuit. The "General Reset" input 80 to AND circuit 79 is normally negative, going positive only after all the data has been transferred. Thus, application by AND circuit 53 of the positive pulse on input line 77 to OR circuit 78 causes the OR circuit to produce a negative output on line 81 to AND circuit 79, operating the AND circuit to produce a positive signal on line 82, latching the OR circuit 78. The negative output of the OR circuit 78 is also supplied to an output terminal 83, which remains negative until General Reset input 80 goes positive.

The OR circuit 78 of the "Gate Service Out" latch thereby becomes activated on the phase 1 of the clock cycle occurring a predetermined delay time after the first service in has been transmitted to the CPU, this predetermined delay time being equal to the expected delay time between the transmission of a service in to the CPU and the receipt of a service out therefrom.

Figure 3:
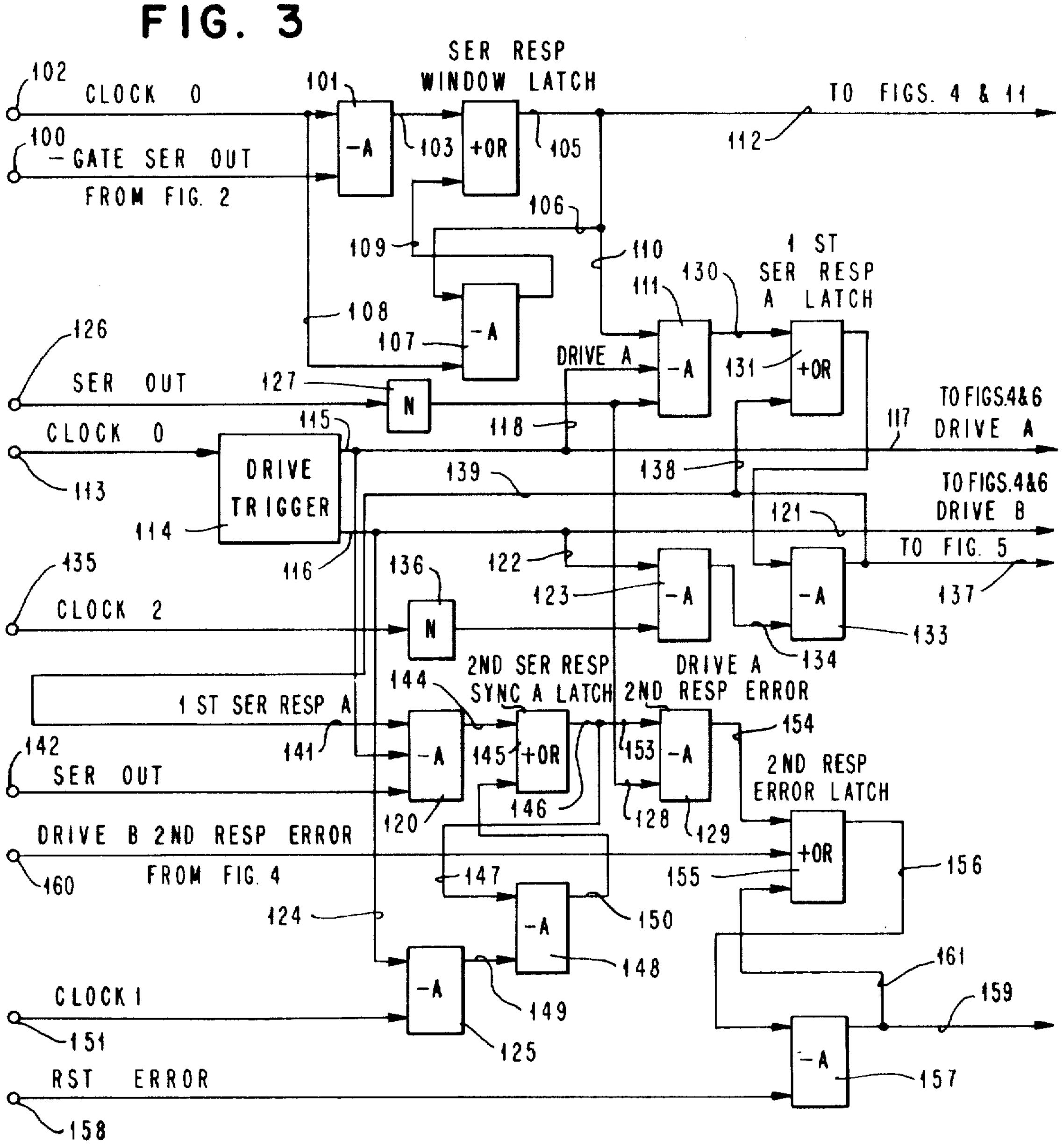
Figure 4:
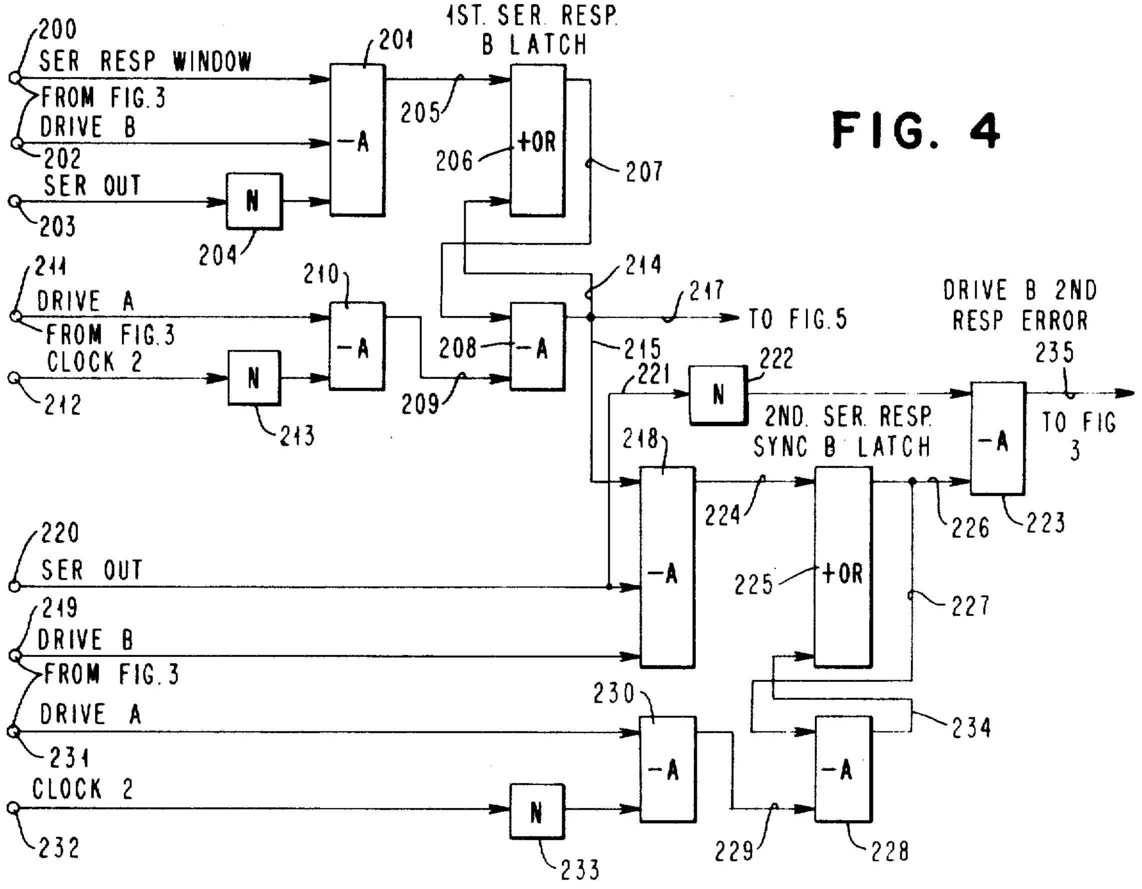

Referring now to FIGS. 3 and 4, circuitry is illustrated for detecting the receipt of two service outs within a single cycle of the clock, thereby indicating an erroneous operation.

In FIG. 3, the Gate Service Out signal at terminal 83 of FIG. 2 is supplied at "Gate Service Out" terminal 100 as an input to −AND circuit 101. The other input to the AND circuit comprises the phase 0 clock pulse at input terminal 102. Hence, the AND circuit is operated upon receipt of the negative Gate Service Out signal, the operation thereof being interrupted by the periodic positive phase 0 clock pulses. The output of the AND circuit, when operated, comprises a positive signal appearing on line 103 as an input to +OR circuit 104. The resultant output of the Or circuit is a negative signal on line 105, which is supplied on line 106 as an input to −AND circuit 107. The other input of the AND circuit appears on line 108 and comprises the same phase 0 clock pulse as is an input to AND circuit 101. Hence, AND circuit 107 is similarly operated subject to periodic interruptions in operation due to the application of the positive phase 0 pulses thereto. The positive output of the AND circuit on line 109 is supplied as another input to OR circuit 104. The OR circuit 104 and AND circuit 107 thus comprise a latch which is operated for three clock phases, interrupted only by the phase 0 pulse.

The output of OR circuit 104 on line 105 is supplied at input 110 to −AND circuit 111 and also on output line 112.

The phase 0 clock signal is also applied at input terminal 113 to drive trigger 114. The trigger may be of any standard type which change state upon application of a positive pulse at the input thereto. In one state a positive signal is supplied at output 115 and a negative signal supplied at output 116. In the other state the positive signal is supplied at output 116 and a negative signal at output 115. Since the circuits to which the outputs are connected respond to the application of negative signals, the trigger is considered to be in State "A" when output 115 is negative and will be considered to be in state "B" when output 116 is negative.

Drive "A" is supplied to line 117, to input 118 of AND circuit 111 and to input 119 of −AND circuit 120. Drive "B" output 115 is connected to output line 121, input 122 of −AND circuit 123 and to input 124 of −AND circuit 125.

The Drive A output 115 of the binary trigger thus remains negative for a complete cycle of the clock until a phase 0 clock pulse is received at input 113. Then, the Drive A output becomes positive for the next cycle of the clock, etc. Similarly, while Drive A is positive, Drive B 116 is negative for a complete cycle of the clock, becoming positive upon application of the next phase 0 clock pulse at input 113 to the binary trigger.

The Drive A input 118 to AND circuit 111 thus enables the circuit to be operated during alternate cycles of the clock. The enabling of the AND circuit is limited by the "Service Response Window" signal supplied from OR circuit 104 at the input 110 of the AND circuit. This signal blocks the AND circuit during the phase 0 clock time. The remaining input to the AND circuit comprises input terminal 126 as inverted by NOT circuit 127, the terminal 126 being connected to service out line 18 of FIG. 1. Service out signals appearing at interlock control 14 of FIG. 1 on service out line 18 are supplied at service out input 126 to NOT circuit 127. This circuit inverts the service out signals for application to AND circuit 111 and to input 128 of −AND circuit 129.

A service out signal applied from NOT circuit 127 to AND circuit 111 while the other inputs 110 and 118 thereto are enabled, causes the AND circuit to produce a positive output signal on line 130 to −OR circuit 131. The OR circuit responds by producing a negative signal on line 132 to −AND circuit 133.

The other input to AND circuit 133 comprises line 134 from AND circuit 123. AND circuit 123 has two inputs, the Drive B input 122, discussed previously, and the input from phase 2 clock input terminal 135, as inverted by NOT circuit 136. Drive B is positive when AND circuit 111 is operated.

Hence, the output of NAND circuit 123 is negative, enabling AND circuit 133. The AND circuit 123 is operated only upon the coincidence thereat of the negative Drive B input and the phase 2 clock pulse from input terminal 135, as inverted by NOT circuit 136. Activation of the AND circuit 123 thereby operates to produce a positive output on line 134 to thereby disable AND circuit 133.

The output of AND circuit 133 is supplied on output line 137, line 138 to OR circuit 131, the OR circuit 131 and AND circuit 134 thus comprising a latch, and on line 139 to delay circuit 140.

Since AND circuits 111 and 123 are enabled respectively by the Drive A signal and the Drive B signal, they are never simultaneously enabled. Assuming that the negative Drive A input is supplied to AND circuit 111 while the Service Response Window latch supplies a negative signal at input 110, receipt of the service out signal from the CPU as inverted by NOT circuit 127, thereby supplies a negative input to AND circuit 111 which causes a positive pulse to be supplied on line 130 to operate OR circuit 131. The OR circuit supplies a negative signal on line 132 to AND circuit 133. Since the Drive B input 122 to AND circuit 123 is positive, the AND circuit is not operated and supplies a negative input to AND circuit 133. This AND circuit is thereby enabled and is operated by the output of OR circuit 131. The AND circuit supplies its positive output on line 138, maintaining the OR circuit 131 in operation, thereby latching the output of the OR circuit. The AND circuit 133 remains enabled, latching the OR circuit, until the clock completes its cycle. At that time, the Drive B input 122 to AND circuit 123 becomes negative. A short time later the clock enters phase 2, supplying a positive signal at input 135, which is inverted by a NOT circuit 136 and supplied to the other input of AND circuit 123. The AND circuit thus produces a positive output on line 134, disabling AND circuit 133.

Since Drive B is negative, Drive A 118 input to AND circuit 111 is positive, disabling that circuit so that a negative signal is supplied to OR circuit 131. The subsequent disabling of AND circuit 133 at phase 2 of the clock thereby causes the OR circuit to terminate its negative output on line 132.

In this manner, OR circuit 131 and AND circuit 133 indicate receipt of a service out signal from the CPU during the Service Response Window time, the circuits being latched until the phase 2 clock time of the subsequent cycle of the clock. In net then, outputs 137 and 139 of AND circuit 133 indicate the receipt of a first service out during a single Service Response Window that occurs during the Drive A cycle of the clock as defined by binary trigger 114.

The output 139 of the AND circuit 133 is then employed to enable circuitry for detecting a second service out signal during the same Service Response Window, an error condition. To accomplish this, output 139 is supplied to input 141 of −AND circuit 120. As previously explained, AND circuit 120 is initially enabled by the Drive A signal at input 119 and further enabled by application of the delayed "1st Service Response A" signal at input 141. The service out signals from the CPU on line 18 of FIG. 1 are supplied at input terminal 142 to the AND circuit 120. The direct application of the positive service out signal to −AND circuit 120 prevents operation thereof until termination of the initial service out. This imposes a delay after the operation of OR circuit 131 by the initial service out to prevent operation of the subsequent circuitry by the same initial service out. The termination of the service out supplies a negative input to AND circuit 120 operating it to supply a positive output on line 144 to +OR circuit 145.

When so operated, OR circuit 145 supplies a negative signal at output 146. This output is supplied to input 147 of −AND circuit 148. OR circuit 145 and AND circuit 148 serve as a latch functioning similarly to the latch comprising OR circuit 131 and AND circuit 133. The other input to AND circuit 148 comprises line 149 from AND circuit 125. One input to the AND circuit 125 comprises the Drive B signal supplied at input 124. This input is positive while OR circuit 145 is operated, thus causing the AND circuit 125 to supply a negative signal on line 149 to thereby enable AND circuit 148. The output of the OR circuit 145 thus operates AND circuit 148 to supply a positive signal on line 150 to the OR circuit, thereby latching the OR circuit. AND circuit 148 holds the OR circuit in the latched condition until the clock completes its cycle and supplies a phase 0 signal to binary trigger 114, causing Drive B output 116 to become negative and thereby enable input 124 of the AND circuit 125. Subsequently, the clock supplies a phase 1 signal at clock 1 input terminal 151 which is inverted by NOT circuit 152 to operate AND circuit 125 to thereby supply a positive signal to AND circuit 148. This positive signal disables the AND circuit 148, thereby unlatching OR circuit 145.

The output of the OR circuit 145 thus comprises a windout signal called 2nd Service Response Synch A which is supplied to input 153 of −AND circuit 129. This AND circuit is enabled thereby to detect a second received service out signal during the cycle of the clock, an erroneous condition. Input 128 of the AND circuit is therefore operated only during the receipt at Service Out input terminal 126 of a second service out pulse. This pulse is inverted by NOT circuit 127 and supplied to the AND circuit 129. At this time, the indication by OR circuit 145 that the received service out signal which is supplied AND circuit 129 is the second service out signal received during a single phase of the binary trigger 114 thereby operates the AND circuit 129. The AND circuit transmits a positive signal on line 154 to +OR circuit 155. OR circuit 155 thereby transmits a negative signal on line 156 to –AND circuit 157. The other input to the AND circuit is supplied at "Reset Error" input terminal 158. This input is normally negative, made positive only upon recognition by the process and control circuitry 20 of FIG. 1 that an error has occurred. In view of this input being normally negative, AND circuit 157 is thereby enabled to provide a positive output at output line 159 and on line 160 in response to the negative signal from OR circuit 154. The positive signal on line 160 thereby latches OR circuit 155. The latching is thus maintained until the positive reset error signal is received from process and control circuitry 20 in FIG. 1. Output line 159 from the AND circuit 157 is connected to process and control circuitry 20 of FIG. 1. The positive signal supplied from the AND circuit indicates to the process and control circuitry that two service outs were received during a single cycle of the clock. This is an error condition and the process and control circuitry will indicate to the CPU that the error condition exists and, by so doing, request further instructions from the CPU.

Another input to OR circuit 155 is the "Drive B 2nd Response Error" input 161. This input is derived from the circuitry of FIG. 4 and indicates that two service outs were received during a single Drive B cycle of the clock. This likewise indicates an error and causes operation of OR circuit 155 and AND circuit 157 to latch and provide a positive output on the second response error output 159 to the process and control circuitry 20 of FIG. 1.

Referring now to FIG. 4, the circuitry thereat is substantially identical to the detection circuitry of FIG. 3, except that it operates to detect two service outs during the B cycle of the clock. The Service Response Window output from OR circuit 104 on output line 112 of FIG. 3 is connected to input 200 of AND circuit 201. Also from FIG. 3, the Drive B output 121 of binary trigger 114 is supplied at input terminal 202 of AND circuit 201. The remaining input to the AND circuit is applied at "Service Out" input terminal 203 to NOT circuit 204, which inverts that signal for application to the AND circuit. Service out input terminal 203 is connected to the service out line 18 of FIG. 1 for the receipt of positive service out signals from CPU 10. Thus, Service Response Window input 200 and Drive B input 202 enable AND circuit 201 to detect the receipt of a service out during a Service Response Window time of the B cycle of the clock.

If such a service out signal is received, AND circuit 201 operates by supplying a positive output on line 205 to +OR circuit 206. The OR circuit responds by supplying a negative signal on line 207 to –AND circuit 208. The other input to the AND circuit appears on line 209 and is derived from –AND circuit 210. The inputs to that AND circuit comprise Drive A input 211 from the binary trigger 114 on line 121 of FIG. 3 and the Phase 2 clock input 212 from the divider-counter 26 of FIG. 12. The Phase 2 clock signal is supplied to NOT circuit 213 which inverts the signal for application to the AND circuit. Since Drive A is opposite in phase to Drive B, the input signal at terminal 211 to AND circuit 210 will be positive whenever AND circuit 201 and OR circuit 206 are operated. Thus, the output of AND circuit 210 is a negative signal on line 209 to AND circuit 208. The AND circuit is thereby enabled to be operated by the negative output on line 207 from OR circuit 206. The AND circuit thus provides the positive output on line 214 to the other input of OR circuit 206 on line 215 to –AND circuit 218, and on output line 217. The positive input on line 214 to OR circuit 206 thereby latches the OR circuit on so that it continues to supply a negative output on line 207 to maintain the AND circuit 208 on to continue providing a positive signal on line 215 and on output line 217.

At the next cycle of the clock, Drive A input 211 to AND circuit 210 goes negative, and at the phase 2 clock time of that cycle input 212 goes positive to, after being inverted by NOT circuit 213, operate AND circuit 210 and provide a positive output on line 209. This positive signal disables the AND circuit 208 and terminates the positive output therefrom.

Delay circuit 216 inverts and delays an applied signal slightly more than one phase of the clock. The delayed and inverted signal is then applied to AND circuit 218. Another input to AND circuit 218 is the Drive B signal from the binary trigger 113 of FIG. 3 supplied at input terminal 219. The Drive B pulse together with the output of AND circuit 208 thereby enables AND circuit 218 for operation immediately after the detection by OR circuit 206 of the first received service out during the "B" clock cycle. The operation of AND circuit 218 is delayed, however, by the application of the positive service out signal from service out line 18 of FIG. 1 input 220 to AND circuit 218 and on line 221 to NOT circuit 222 for application to –AND circuit 223. When the initial service out signal terminates, the resultant negative signal at input 220 operates AND circuit 218 to thereby provide a positive output signal on line 224 to +OR circuit 225. OR circuit 225 then provides a negative output signal on line 226 to –AND circuit 223 and on line 227 to –AND circuit 228. The other input to AND circuit 228 comprises line 229 from – AND circuit 230. The inputs to that AND circuit comprise Drive A input 231 from the binary trigger 113 of FIG. 3 and a Phase 1 clock input 232, as inverted by NOT circuit 233. Since OR circuit 225 may be operated only while the Drive B input 231 to AND circuit 230 is positive. The output from AND circuit 230 on line 229 is therefore negative, enabling AND circuit 228. AND circuit 228 thus provides a positive output on line 234 to the OR circuit, thereby latching the OR circuit to continue providing its negative output on lines 226 and 227.

The latched output from OR circuit 225 thus comprises a window signal called 2nd Service Response Synch B which enables AND circuit 223 to detect a second service out during a single "B" cycle of the clock. The other input to AND circuit 223 comprises the inverted service out signal from NOT circuit 222. Hence, line 226 and NOT circuit 222 are both negative upon detection of the second service out, thereby operating AND circuit 223 to provide a positive signal on "-Drive B 2nd Response Error" output line 235. As discussed with respect to FIG. 3, the output signal on line 235 is supplied to input terminal 161 of FIG. 3 and employed to operate the error indicating circuitry thereof.

Figure 5:
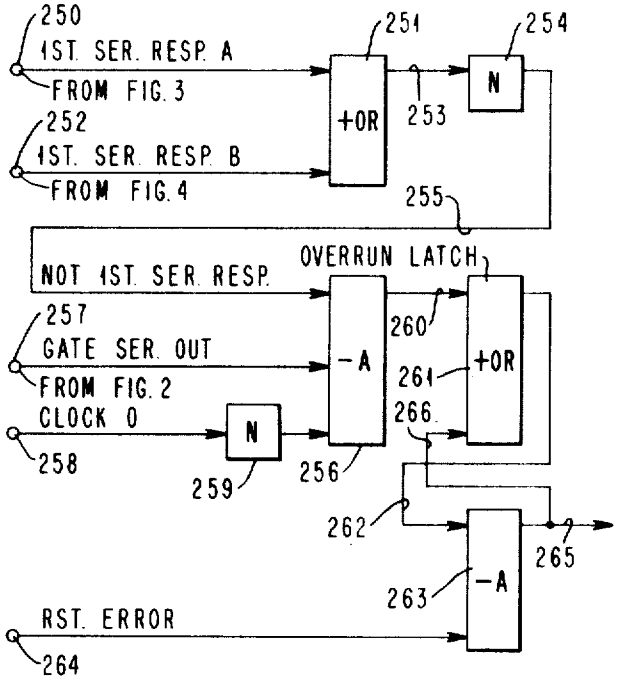

Referring now to FIG. 5, the circuitry shown therein is employed to detect the absence of a service out signal during any time period when one is expected.

As discussed previously, AND circuit 133 of FIG. 3 is latched upon detection of a first service out signal received during the Service Response Window at the cycle of the clock wherein Drive A is operated. Likewise, AND circuit 208 of FIG. 4 is latched on upon detection of a first service out signal received during the Service Response Window of the cycle of the clock wherein Drive B is operated. Each of these AND circuits remains latched until disabled at the Phase 2 clock time of the following clock cycle. Hence, if the first or only service response was received during the Service Response Window, the proper AND circuit would remain latched on until the phase 2 clock time of the following clock cycle. Therefore, either AND circuit 133 of FIG. 3 or AND circuit 208 of FIG. 4 must be on at phase 0 clock time of that following clock cycle if a proper service out signal was received.

To accomplish this check, output line 137 of AND circuit 133 of FIG. 3 is connected to "1st Service Response A" input terminal 250 to +OR circuit 251, and output line 215 from AND circuit 208 of FIG. 4 is connected to "1st Service Response B" input terminal 252, also connected to OR circuit 251. If either of these AND circuits is on, a positive signal will be supplied to the corresponding input terminal 250 or 252, thereby operating the OR circuit. The OR circuit then applies a negative output signal on line 253 to NOT circuit 254. The NOT circuit inverts the signal, thereby supplying a positive output on line 255 to –AND circuit 256, thereby indicating that a service out was received.

AND circuit 256 is employed to sample the output of NOT circuit 254 at the phase 0 clock time immediately after any service out signal is expected. To enable the AND gate only at those times when service outs are expected, the negative Gate Service Out signal on line 83 of FIG. 2 from OR circuit 78 is employed as the "Gate Service Out" input 257 to the AND circuit 256. As discussed previously, this signal is operated at the phase 1 clock time when the first service out signal is expected on line 18 of FIG. 1 from the CPU and maintains the operated negative output until reset after all the service outs have been received. The sample control input to AND circuit 256 comprises phase 0 clock input terminal 258 which is connected to NOT circuit 259. At clock 0 time, a positive signal is applied to terminal 258 and inverted by NOT circuit 259 to enable AND circuit 256.

Thus, at the phase 0 time of the clock cycle immediately after the clock cycle when Gate Service Out input 257 to the AND circuit was operated, AND circuit 256 is enabled to be operated upon the presence of a negative signal on line 255. Such a negative signal would indicate that no service out was detected during the immediately preceding Service Response Window.

Such a condition is an error and is designated by AND circuit 256 providing a positive signal on line 260 to OR circuit 261. OR circuit 261 then provides a negative output signal on line 262 to −AND circuit 263. The other input to AND circuit 263 comprises "Reset Error" input terminal 264. This input is normally negative, becoming positive only after the process and control circuitry 20 of FIG. 1 has recognized the error condition and then supplies a positive input thereto. Since input 264 is negative upon operation of OR circuit 261, AND circuit 263 supplies a positive output on output line 265 and on line 266 to OR circuit 261. The positive signal on line 266 latches OR circuit 261 so that it continues to supply it negative output to the AND circuit 263. The resultant latched positive output signal on line 265 is transmitted to the process and control circuitry 20 of FIG. 1, thereby indicating the occurrence of the "overrun" error. Overrun means that more data has been transmitted to the CPU than the CPU has received and so indicated by transmission of service out signals.

Process and control circuitry 20 of FIG. 1 detects the occurrence of the error condition by the signal on line 265 and so informs the CPU 10. Upon proper recognition of this error, the process and control circuitry 20 supplies a positive signal to input 264 to AND circuit 263. This positive signal disables AND circuit 263, terminating its positive output on lines 265 and 266. Thus, OR circuit 261 is also disabled and the latch thereby turned off.

Figure 8:
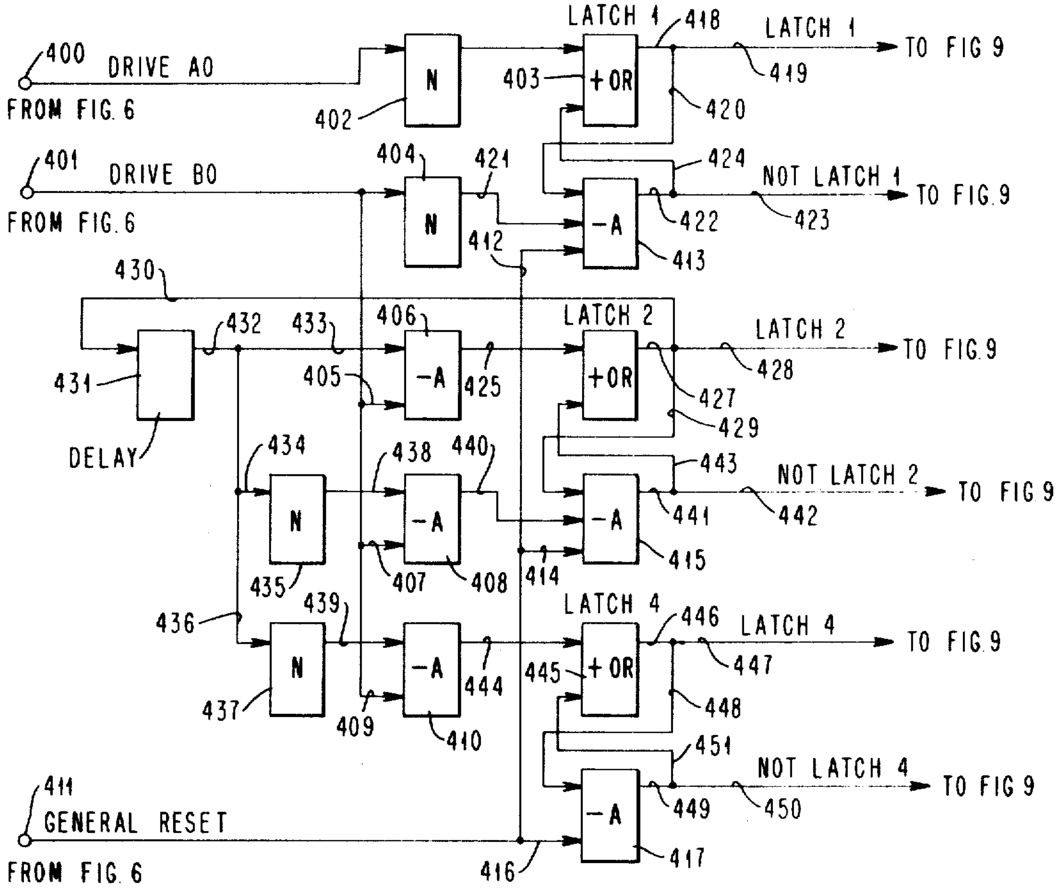

Referring now to FIG. 6, circuitry is illustrated for driving the counter of FIG. 8 and for detecting that all of the data to be transferred between the CPU and the control unit have been accounted for by means of service outs from the CPU.

The Drive A output signals from line 117 of binary trigger 114 of FIG. 3 are supplied at "Drive A" input 300 to −AND circuit 301. The Drive B output from line 121 of the binary trigger in FIG. 3 is supplied at "Drive B" input 302 to −AND circuit 303. An input to both AND circuits comprises "Response Delay" input 304 to delay circuit 305. The delay circuit inverts the Response Delay input signal and supplies the same to, respectively, input 306 of AND circuit 301 and input 307 of AND circuit 303 after a delay of slightly more than one phase of the clock. The delay prevents premature termination of the output of the circuitry of FIG. 6 after the Response Delay input becomes negative. As discussed previously with respect to input 63 of FIG. 2, the Response Delay input is initially positive, becoming negative a predetermined time after the initiation of the Run Clock output signal on line 55 of FIG. 2 to the input terminal 27 of the clock of FIG. 12. This predetermined time is established by the circuitry of FIG. 8, as will be explained hereinafter, as driven by the presently described circuitry of FIG. 6.

Hence, Response Delay input 304 is thus initially a positive signal inverted by delay circuit 305 and supplied to input 306 of AND circuit 301 and input 307 of AND circuit 303. This input, together with either the Drive A or Drive B input enables the AND circuits 301 and 303 for alternate cycles of the clock of FIG. 11.

As the clock is initiated by the Run Clock input thereto, and once every cycle thereafter, the clock supplies a phase 0 clock pulse at input terminal 308 to NOT circuit 309. The phase 0 clock pulse is thus inverted by NOT circuit 309 and supplied to input 310 of −AND circuit 311, input 312 to AND circuit 301, and input 313 to AND circuit 303. The inverted clock signals thereby operate AND circuit 301 during the "A" cycles of the clock and AND circuit 303 during the "B" cycles of the clock. The positive output of AND circuit 301, when operated, on line 314 is inverted by NOT circuit 315 and the resultant negative signal supplied on "Drive A0" output line 316. The positive output of AND circuit 303, when operated, on line 317 is inverted by NOT circuit 318 and the resultant negative signal supplied on "Drive B0" output line 319. As will be explained hereinafter, these "A0" and "B0" outputs are supplied to the circuitry of FIG. 8 for determining the predetermined Response Delay.

The remainder of the circuitry of FIG. 6 comprises means for detecting that the last service out has been received from the CPU and resetting the interlock control circuitry as a whole.

The circuitry of FIG. 10, as will be explained hereinafter, supplies a negative "Byte 0" signal to input terminal 320 of AND circuit 311. At the next following phase 0 clock pulse, NOT circuit 309 supplies a negative signal at input 310 to the AND circuit. This negative signal operates the AND circuit to supply a positive output on line 321 to +OR circuit 322. OR circuit 322 responds by supplying a negative output on output line 323 and on line 324 to −AND circuit 325. The other input to the AND circuit comprises the phase 3 clock input 326. This input is normally negative except for application thereto of the positive Phase 3 clock pulse. Hence, the normally negative input enables the AND circuit to respond to the operation of OR circuit 322, which occurs during clock zero time. The AND circuit thus responds by supplying a positive output on line 327 to the OR circuit 322. The AND circuit thereby latches the operation of OR circuit 322 until the subsequently appearing Phase 3 clock pulse. This pulse, being positive, disables the AND circuit and unlatches the OR circuit 322. In this manner, the output of OR circuit 322 is negative for the phase 0, 1 and 2 portions of the cycle of the clock when a Byte 0 signal has been received, and is disabled at the reception at AND circuit 325 of the phase 3 clock pulse. The output of the OR circuit at 322 is also supplied on line 328 to −AND circuit 329. The other input to the AND circuit comprises the phase 1 clock input 330 which is supplied to and inverted by NOT circuit 331. Since the output of the OR circuit is normally positive, except for the negative signal lasting for three phases of the clock after the Byte 0 signal has been received, the AND circuit is enabled to pass only the inverted phase 1 clock pulse during that time period. Thus, after receipt of the Byte 0 input signal at input terminal 320, AND circuit 329 produces a positive output pulse on output line 332 during the immediately following phase 1 time. The signal on output line 332 is thus normally negative subject to the provision of a positive pulse when all of the data transferred between the CPU and the control unit has been accounted for by the receipt of service out signal from the CPU. This output signal on line 332 is called the "General Reset" output. Its function is to cause a general reset of the interlock control circuitry 14 of FIG. 1.

Figure 7:
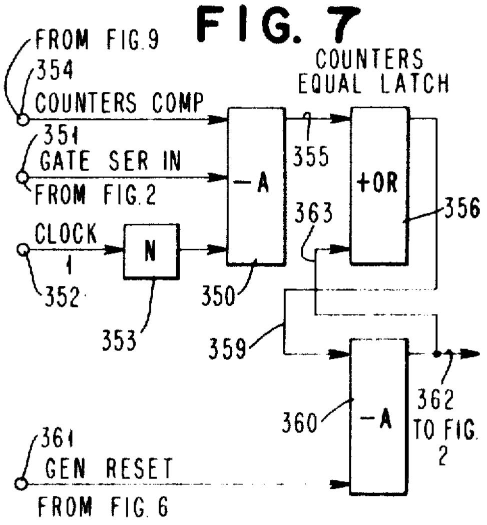

Referring now to FIG. 7, circuitry is illustrated for detecting that the number of service outs have been received from the CPU which is equivalent to the number of blocks of data to be transferred between the CPU 10 and the control unit 12 of FIG. 1, less the number of cycles of the clock of FIG. 12 comprising the delay between transmission of a service in signal on line 19 to the CPU and subsequent receipt of the corresponding service out on line 18 at the control unit, as shown in FIG. 1. At that time, due to the delay, a service in must have been transmitted to the CPU 10 for each block of data to be transmitted between the CPU and the control unit. Thus, the output of the circuitry of FIG. 7 is employed to reset the Gate Service In latch, comprising OR circuit 36 and AND circuit 40 of FIG. 2. Resetting that latch will prevent the transmission of additional service ins on line 19 from the control unit to CPU.

The circuitry of FIG. 7 comprises a −AND circuit 350 having three inputs. "Gate Service In" input terminal 351 is connected to output line 42 of OR circuit 36, illustrated in FIG. 2. This output is operated to supply a negative signal immediately after the "Go" signal is received from Process and Control circuitry 20 of FIG. 1. This signal remains negative until such time as an output is supplied from the circuitry of FIG. 7 to input terminal 44 of FIG. 2. Hence, the input signal from terminal 351 is continuously negative, enabling the AND circuit, so long as service in signals are being gated from the control unit.

Another input to the AND circuit 350 comprises phase 1 clock input 352 which is supplied to and inverted by NOT circuit 353. Thus, at every phase 1 of the clock, a positive pulse is received at input terminal 352, inverted by NOT circuit 353, and supplied to the AND circuit. In this manner, inputs 351 and 352 cause the AND circuit 350 to be enabled during the Phase 1 clock time of every clock cycle while service ins are being transmitted from the control unit to the CPU.

The third input to AND circuit 350 comprises "Counters Compare" input 354. As will be discussed hereinafter with respect to FIG. 9, a negative signal is supplied at input 354 when the byte counter, which counts the number of service out signals received from the CPU, is equal to the delay counter, which establishes the number of cycles of the clock equal to the delay between the transmission of a service in to the CPU and receipt therefrom of a corresponding service out. The Counters Compare input indicates that the two counters are equal. Hence, this equality represents that the number of service out signals yet to be received from the CPU is equal to the delay between the transmission of the service in and the receipt of the corresponding service out. Therefore, all of the service ins representing the totality of data to be transferred between the CPU and the control unit for the instant record have been transmitted to the CPU.

AND circuit 350 responds to the Counters Compare signal at Phase 1 clock time by producing a positive output on line 355 to +OR circuit 356. The OR circuit thus responds by producing a negative output signal on line 359 to −AND circuit 360. The other input to AND circuit 360 comprises "-General Reset" input terminal 361. Input terminal 361 is connected to "General Reset" output line 332 from AND circuit 329 of FIG. 6. As discussed with respect to FIG. 6, the signal on output line 332 is normally negative, going positive only after all service outs representing the total number of blocks of data transferred between the CPU and the control unit have been received from the CPU. This input thus can go positive only a predetermined number of clock cycles after AND circuit 350 is operated. AND circuit 350 and OR circuit 356 therefore produce the negative output to AND circuit 360 prior to the negative input at input terminal 361 becoming positive. Hence, AND circuit 360 is enabled by the negative input from terminal 361 when OR circuit 356 supplies the negative output on line 359.

AND circuit 360 thereby operates and supplies a positive output on Counters Equal output line 362 to terminals 44 and 54 of FIG. 2 and on line 363 to the OR circuit 356. The positive signal on line 363 latches the OR circuit until the positive General Reset signal is received from the circuitry of FIG. 6. At that time, the AND circuit 360 is disabled and terminates operation of the OR circuit 356.

The positive signal on line 362 to terminal 44 of FIG. 2 disables AND circuit 40 of FIG. 2 which, in turn, disables OR circuit 36. Disabling of the OR circuit also causes disabling of AND circuit 48, thereby preventing the transmission of any further service in signals on line 19 to the CPU.

The circuitry of FIG. 7 therefore indicates that the sufficient number of service out signals have been received from the CPU which, when taken together with the predetermined delay required for transmission of a service in signal and the receipt of the corresponding service out signal, points out that the service in signal transmitted immediately prior to the provision of the Counters Equal signal on output line 362 was the last service in signal to be transmitted to the CPU. The total number of service ins thus allowed to be transmitted to the CPU comprises precisely the number of bytes of data included in the record being transferred.

Additionally, when latched on, the AND circuit 360 supplies a positive signal to input 54 of trigger 51 in FIG. 2. This signal has no effect on the operation of the trigger, the trigger maintains a positive output on line 55. The trigger remains on until AND circuit 360 is turned off. The trigger 51 responds to the negative-going signal at input 54 by switching to the negative state, supplying a negative signal at output line 55. In this manner, the clock of FIG. 12 is kept running until AND circuit 360 is turned off by the General Reset input pulse at input 361.

Referring now to FIG. 8, a binary-coded counter is illustrated for counting the cycles of the clock of FIG. 12 as defined by binary trigger 114 of FIG. 3 and the circuitry of FIG. 6. This count is then employed by the compare logic of FIG. 9, discussed hereinafter, to establish the predetermined response delay time. This predetermined delay time comprises the delay to be expected for transmission to the service in on line 19 to the CPU and the receipt of the corresponding service out on line 18 from the CPU at the control unit, as illustrated in FIG. 1. Since it is expected that no round-trip cable delay will comprise more than seven cycles of the clock, the counter of FIG. 8 is arranged to count to a maximum of 7.

In FIG. 8, "Drive A0" input terminal 400 is connected to "-Drive A0" output line 316 of FIG. 6. Likewise, "Drive B0" input terminal 401 is connected to "Drive B0" output line 319 of FIG. 6. The Drive A0 input 400 is connected to NOT circuit 402. The NOT circuit inverts the negative A0 input pulse for application to +OR circuit 403. Drive B0 input terminal 401 is connected to NOT circuit 404, to input 405 of −AND circuit 406, to input 407 of −AND circuit 408 and input 409 of −AND circuit 410. The last input to the circuitry of FIG. 8 comprises "General Reset" input terminal 411. This terminal is connected to "General Reset" output line 332 of FIG. 6. The input terminal 411 is connected to input 412 of −AND circuit 413, input 414 of −AND circuit 415 and input 416 of −AND circuit 417. As discussed with respect to FIG. 6, this signal is normally negative, going positive only after all the service outs have been received from the CPU for the record being transferred between the CPU and control unit. Therefore, the initial negative input to the AND circuits 413, 415 and 417 maintains those circuits enabled for operation.

OR circuit 403 responds to each negative A0 input signal, after being inverted by NOT circuit 402, to provide a negative signal at output 418. When so operated, this negative signal is supplied to "Latch 1" output line 419 and on line 420 to an input of AND circuit 413. The remaining input to AND circuit 413 comprises line 421 from NOT circuit 404. Since OR circuit 403 is operated by an A0 pulse on input terminal 400, and the A0 and B0 inputs operate only on alternate cycles of the clock, the input from terminal 401 to NOT circuit 404 is positive. Therefore, NOT circuit 404 supplies a negative signal on line 421 enabling AND circuit 413. The signal from OR circuit 403 on line 420 thereby operates AND circuit 413 to supply a positive signal at output 422. This positive signal is supplied on "Not Latch 1" output line 423 and on line 424 to OR circuit 403. OR circuit 403 and AND circuit 413 thereby comprise a latch the positive signal on line 424 latching OR circuit 403 to maintain its negative state at output 418.

The latch comprising OR circuit 403 and AND circuit 413 remains on until the following Drive B0 pulse is received at input terminal 401. This negative signal is supplied, inter alia, to NOT circuit 404. There, the negative signal is inverted and supplied on line 421 to AND circuit 413. This positive signal disables AND circuit 413, causing it to provide a negative signal at output 422. This negative signal is now supplied on output line 423 and on line 424 thereby to disable OR circuit 403. When so disabled, the OR circuit supplies a negative signal at output 418. This negative signal is now supplied on output line 419.

The Drive B0 signal is also supplied to AND circuits 406, 408 and 410. The output of AND circuit 406 is connected by line 425 to +OR circuit 426. OR circuit 426 has an output 427 connected to "Latch 2" output line 428, to line 429 and to feedback line 430. The feedback line 430 is connected to a delay circuit 431. The delay circuit inverts any supplied signal and delays the signal slightly more than one phase of the clock. The resultant signal is supplied on output line 432. Output line 432 is connected to input 433 of AND circuit 406, to input 434 of NOT circuit 435 and to input 436 of NOT circuit 437.

OR circuit 426 and AND circuit 415 comprise a latch, as will be explained hereinafter. The latch is initially off, due to a previous General Reset input signal from input terminal 411. The latch being off, OR circuit 426 supplies a positive signal at output 427. This positive signal is supplied by means of the feedback line 430 to delay circuit 431. The delay circuit inverts the signal and supplies the resultant negative signal on line 432. The negative signal is supplied to input 433 of AND circuit 406, thereby enabling the AND circuit. The negative signal is also supplied to input 434 of NOT circuit 435 and input 436 of NOT circuit 437. Both these circuits invert the signal, NOT circuit 435 supplying the resultant positive signal on line 438 to AND circuit 408, and NOT circuit 437 supplying the resultant positive signal on line 439 to AND circuit 410. Therefore, AND circuits 408 and 410 are disabled because of the positive inputs thereto.

The negative B0 input pulse at terminal 401 therefore operates only the AND circuit to thereby supply a positive signal on line 425 to OR circuit 426. OR circuit 426 responds by supplying a negative signal at output 427. The negative signal is supplied on output line 428, on feedback line 430 and on line 429 to AND circuit 415. Delay circuit 431 delays any change in the output therefrom until the B0 input pulse has ceased. Therefore, the feedback has no immediate effect on the remainder of the circuitry of FIG. 8.

Since the undelayed input to AND circuit 408 comprises a positive signal, the AND circuit is not operated and therefore supplies a negative signal on line 440 to AND circuit 415. This signal, together with the signal on input line 414, thereby enables the AND circuit to operate as a result of the negative pulse on line 429. The NAND circuit thereby operates by supplying a positive signal at output 441. This positive output is then supplied on "Not Latch 2" output line 442 and on line 443 to OR circuit 426. This positive input to the OR circuit thereby latches the OR circuit so as to maintain its negative output.

Application of the first B0 pulse subsequent to the first A0 pulse therefore turns Latch 1 off and turns Latch 2 on. This change is reflected in the change of the outputs of the latches, Latch 1 output line 419 and Not Latch 2 output line 442 switching from negative to positive, and Not Latch 1 output line 423 and Latch 2 output 428 switching from positive to negative. This indicates that the clock of FIG. 12 has begun its second cycle.

On the third cycle of the clock another A0 pulse is received at input terminal 400, thereby again operating Latch 1. Now, both Latch 1 and Latch 2 are operated, indicating that the clock has begun its third cycle.

At this time, the output of operated OR circuit 426 on feedback line 430 is negative. This negative signal is inverted by delay circuit 431 to supply a positive signal at its output 432. This positive output is supplied at input 433 to AND circuit 406, thereby preventing operation of the AND circuit. The positive signal is also supplied to input 434 of NOT circuit 435 and to input 436 of NOT circuit 437. These circuits invert the signal and supply the resultant negative signal on, respectively, input 438 of AND circuit 408 and input 439 of AND circuit 410, thereby enabling both AND circuits to respond to a subsequent Drive B0 input pulse. When that pulse is received, AND circuit 408 operates by supplying a positive signal on line 440 to AND circuit 415. This positive signal disables AND circuit 415, thereby supplying a negative signal at output 441. This negative signal is supplied on output line 442 and on line 443 to OR circuit 426. The negative signal disables OR circuit 426 so that its output 427 goes positive, the positive signal being supplied on output line 428 and on feedback line 430. The delay circuit 431, however, prevents the feedback signal from having an effect on the circuitry of FIG. 8 while the B0 input pulse is present.

AND circuit 410 responds to the B0 pulse by supplying a positive output on line 444 to +OR circuit 445. OR circuit 445 is thus operated to supply a negative signal at output 446. The negative signal is supplied on "Latch 4" output line 447 and on line 448 to AND circuit 417. Since input 416 to the AND circuit is negative, the AND circuit operates by providing a positive signal at output 449. This positive output signal is supplied on "Not Latch 4" output line 450 and on line 451 to OR circuit 445. This positive signal thereby latches the OR circuit 445 to continue supplying its negative output.

As described previously, the Drive B0 input pulse is again inverted by NOT circuit 404 to supply a positive signal at input line 421 of AND circuit 413. This positive signal thereby causes AND circuit 413 and OR circuit 403 to be turned off.

Thus, the second Drive B0 input signal turns off latches 1 and 2 and turns on latch 4, thereby indicating that the clock is beginning its fourth cycle.

The next Drive A0 input pulse again operates Latch 1, indicating that the clock is entering its fifth cycle.

The next Drive B0 input pulse at input terminal 401 again turns off Latch 1. Since Latch 2 is off, the output 427 from OR circuit 426 is positive. This positive signal is supplied on feedback line 430 and inverted by delay 431. The negative output 432 of the delay circuit is supplied at input 433 of AND circuit 406, thereby enabling that circuit. NOT circuits 435 and 437 again invert the negative output of delay 431 and supply the resultant positive signal on lines 438 and 439, respectively, thereby preventing operation of AND circuits 408 and 410. The third B0 Drive pulse therefore operates only AND circuit 406 to supply a positive signal to OR circuit 426, thereby operating Latch 2. At this time, Latches 2 and 4 are on and Latch 1 is off, thereby indicating that the clock has begun its sixth cycle.

The next Drive A0 pulse at input terminal 400 again operates Latch 1. At this time, Latches 1, 2 and 4 are all on, indicating that the clock is beginning its seventh cycle.

Figure 9:
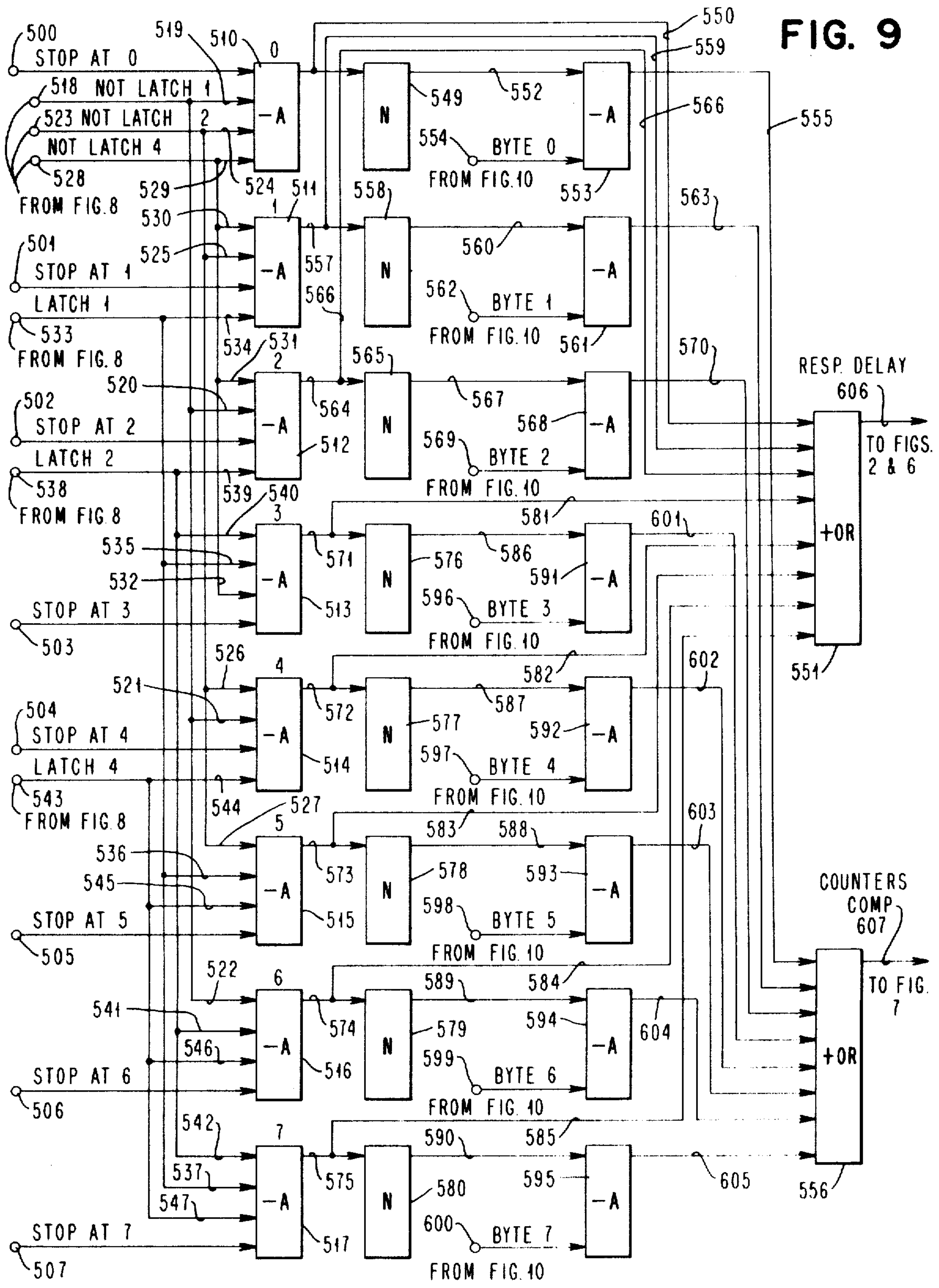

The circuitry of FIG. 9 is arranged to detect the desired output of the circuitry of FIG. 8 during one of the first 7 cycles of the clock. The circuitry of FIG. 9 responds by producing a "Response Delay" output which terminates production of the A0 and B0 pulses by the circuitry of FIG. 6 and thereby prevents further counting by the circuitry of FIG. 8.

After all the service outs have been received from the CPU indicating that an entire record has been transferred between the CPU and the control unit, the circuitry of FIG. 6, as explained previously, supplies a positive signal at General Reset input terminal 411 of FIG. 8. This positive signal is applied to input 412 of AND circuit 413, input 414 of AND circuit 415 and input 416 of AND circuit 417. This positive signal causes each of the AND circuits 413, 415 and 417 to be disabled and supply a negative output, thereby disabling the corresponding OR circuits 403, 426 and 445. The General Reset signal thereby turns off each of the latches to prepare for the transfer of a subsequent record between the CPU and the control unit.

Referring now to FIG. 9, circuitry is shown for employing the output of the counter of FIG. 8 to establish the predetermined delay equivalent to the round-trip delay required for the transmission of a service in to the CPU and the receipt of the corresponding service out at the control unit from the CPU. The circuitry of FIG. 9 also compares the count comprising this predetermined delay with the output of the byte counter of FIG. 10 until that counter has counted down to an equality with the delay count. At that time, all of the service ins corresponding to the number of bytes of transfer data have been transmitted from the control unit. Hence, as discussed with respect to FIGS. 7 and 1, the transmission of further service ins to the CPU is then terminated.

Eight input lines are supplied to the circuitry of FIG. 9 from Process and Control circuitry 20 of FIG. 1. These input lines are supplied to "Stop at 0" input terminal 500, "Stop at 3" terminal 503, "Stop at 4" terminal 504, "Stop at 5" terminal 505, "Stop at 6"terminal 506 and "Stop at 7" terminal 507.

Only one of these input lines is activated by means of a negative signal applied thereto, the remaining 7 lines having a positive signal thereat. The one line having the negative signal may be selected by means of manual switches in the control unit 12 of FIG. 1. The input line so selected designates the number of cycles of the clock of FIG. 12 equal to the round-trip delay for the transmission of a service in on line 19 of FIG. 1 and the receipt of the corresponding service out at the control unit from line 18.

Input terminal 500 is connected to –AND circuit 510, input 501 connected to –AND circuit 511, input 502 connected to –AND circuit 512, input 503 connected to –AND circuit 513, input 504 connected to –AND circuit 514, input terminal 505 connected to –AND circuit 515, input terminal 506 connected to –AND circuit 516 and input terminal 507 connected to –AND circuit 517.

Thus, the negative input signal at one of the terminals 500 through 507 enables the corresponding one of the AND circuits 510 through 517 and the positive input at the remaining input terminals prevents operation of any of the other AND circuits.

This enabling signal remains negative until the manual switches on the control unit 12 are reset.

"Not Latch 1" input terminal 518 is connected to output line 423 of FIG. 8. This input terminal is connected to input 519 of AND circuit 510, input 520 of AND circuit 512, input 521 of AND circuit 514 and input 522 of AND circuit 516. "Not Latch 2" input terminal 523 is connected to output line 542 of FIG. 8. This input terminal is connected to input 524 of AND circuit 510, input 525 of AND circuit 511, input 526 of AND circuit 514 and input 527 of AND circuit 515. "Not Latch 4" input terminal 528 is connected to output line 450 of FIG. 8. This terminal is connected to input 529 of AND circuit 510, input 530 of AND circuit 511, input 531 of AND circuit 512 and input 532 of AND circuit 513. "Latch 1" input terminal 533 is connected to output line 419 of FIG. 8. This input terminal is connected to input 534 of AND circuit 511, input 535 of AND circuit 513, input 536 of AND circuit 515 and input 537 of AND circuit 517. "Latch 2" input terminal 538 is connected to output line 428 of FIG. 8. This terminal is connected to input 539 of AND circuit 512, input 540 of AND circuit 513, input 541 of AND circuit 516 and input 542 of AND circuit 517. "Latch 4" input terminal 543 is connected to output line 447 of FIG. 8. This input terminal is connected to input 544 of AND circuit 514, input 545 of AND circuit 515, input 546 of AND circuit 516 and input 547 of AND circuit 517.

The input terminals 518, 523, 528, 533, 538 and 543 are thus distributed to the inputs of those of the AND circuits 510 through 517 designated by the binary encoded value of that AND circuit. Thus, AND circuit 510 has as its input 500 the "-Stop at 0" input, and therefore is connected to those of the input terminals 518, 523 and 528 having a binary encoded value of 0. AND circuit 511, representing the number 1, therefore substitutes "Latch 1" input 533 for the "Not Latch 1" input 518. The remaining AND circuits are similarly connected to those of the inputs which provide the proper binary encoding.

Output 548 of AND circuit 510 is connected to NOT circuit 549 and, via line 550 to +OR circuit 551. The NOT circuit 549 is connected over line 552 to –AND circuit 553. The other input to the AND circuit comprises "Byte 0" input terminal 554 from FIG. 10. The output of the AND circuit is supplied on line 555 to +OR circuit 556.

The remaining circuitry of FIG. 9 is similarly constructed, output 557 of AND circuit 511 being connected to NOT circuit 558, and over line 559 to the OR circuit 551. The NOT circuit 558 is connected by line 560 to –AND circuit 561, the other input thereto comprising "Byte 1" input terminal 562 from FIG. 10. Line 563 connects the output of AND circuit 561 to OR circuit 556. Output 564 of AND circuit 512 is connected to NOT circuit 565 and on line 566 to the OR circuit 551. Output 567 of NOT circuit 565 is connected to AND circuit 568, having "Byte 2" input 569 as the other input and the output supplied on line 570 to OR circuit 556.

The remaining portions of the circuitry of FIG. 9 are similarly arranged, outputs 571—575 of AND circuits 513—517 being connected to NOT circuits 576—580. The outputs 571—575 of AND circuits 513—517 are also connected by lines 581—585 to OR circuit 551. NOT circuits 576—580 are connected by lines 586—590 to one input of AND circuits 592—595, the other input thereto comprising respectively, "-Byte 3" input 596, "Byte 4" input 597, "Byte 5" input 598, "-Byte 6" input 599 and "Byte 7" input 600. Lastly, the outputs of AND circuits 591—595 are connected by lines 601—605 to OR circuit 556.

The output of OR circuit 551 comprises "Response Delay" output line 606 to FIGS. 2 and 6. The output of OR circuit 556 comprises "Counter Compare" output line 607 to FIG. 7.

Therefore, the selected one of the input terminals 501—507 enables the corresponding AND circuit 511—517 so that only that AND circuit responds to the digitally encoded output of the counter of FIG. 9 represented by the selected AND circuit. When the count of that delay counter equals the amount designated by the selected AND circuit, the AND circuit is operated to supply a positive output signal to OR circuit 551. The OR circuit responds by supplying a negative output on Response Delay output line 606 to FIGS. 2 and 6.

The positive output of the selected AND circuit 510—517 is also inverted by the immediately following NOT circuit 549, 558, 565, 576—580 and supplied to the next AND circuit 553, 561, 568, 591—595. The other input of the AND circuit comprises the output of the byte counter of FIG. 10. Upon the byte counter being counted down to the value represented by the selected AND circuit 510—517, the corresponding AND circuit 553, 561, 568, 591—595 then provides a positive output to OR circuit 556. The OR circuit responds by supplying a negative signal on Counters Compare output line 607 to FIG. 7.

Figure 10:
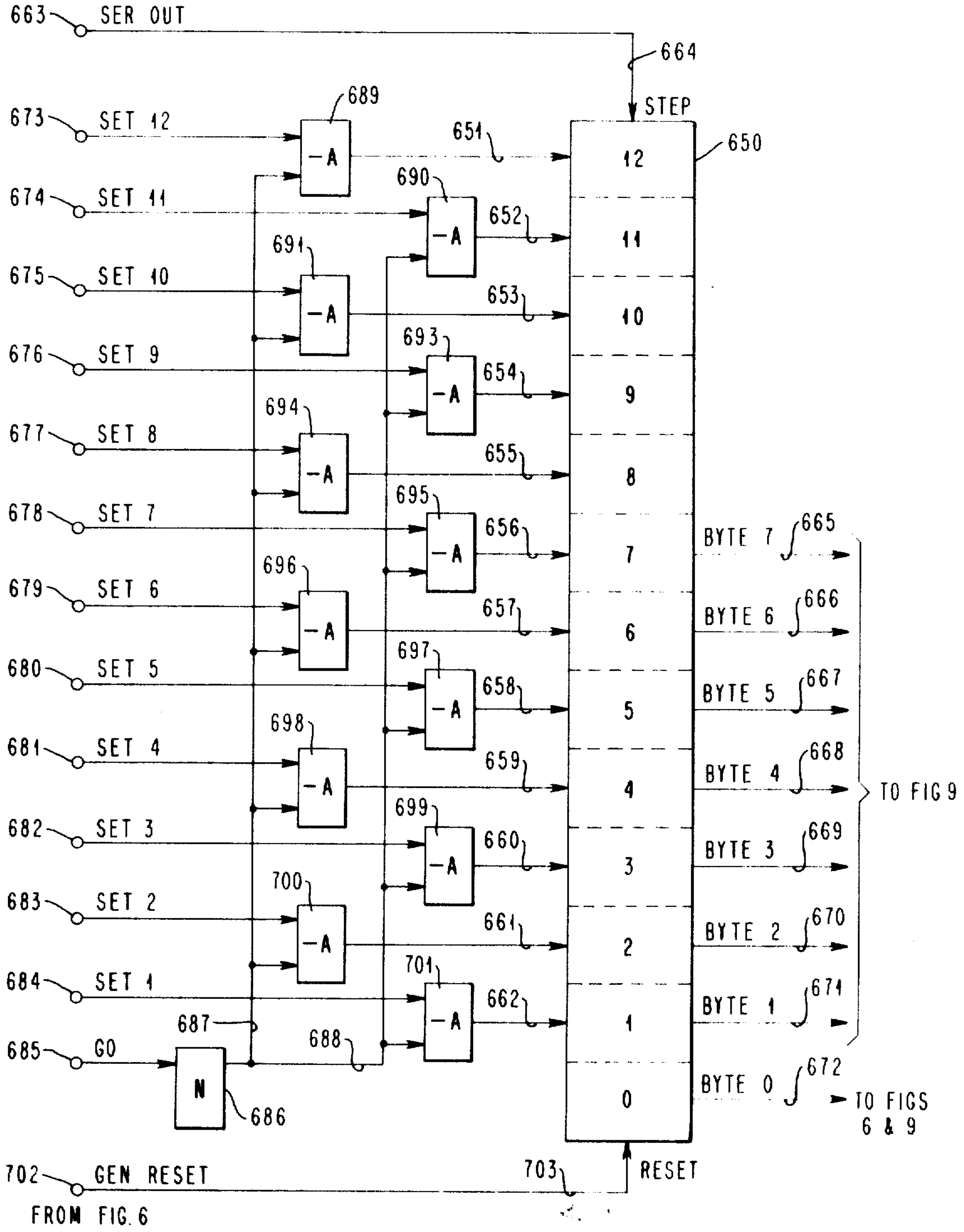

Referring now to FIG. 10, a byte counter is illustrated which may be set to the number of bytes in a record to be transferred between the CPU and the control unit. The byte counter is being counted down from that set value for each service out signal received from the CPU. The outputs of the byte counter are supplied to FIGS. 6 and 9 to indicate the present count of the counter representing the number of service outs expected from the CPU.

In FIG. 10 byte counter 650 comprises a 13-stage ordinary ring counter. The ring counter is arranged so that one of 12 of the 13 stages may be turned on by means of a positive signal appearing at a selected one of the input lines 651—662. Each of the 13 stages is interconnected so that operation of the stage which is turned on will be transferred to the immediately adjacent lower numbered stage upon application of a positive service out signal from the CPU at "Service Out" input terminal 663 applied to the ring counter at the "Step" input 664. Hence, if stage number 9 of the ring counter 650 happens to be on, application of a service out signal at input 664 causes stage 8 to turn on and stage 9 to turn off. Stage 0 is, however, not connected to stage 12. Hence, the counter will not step beyond stage 0. Output lines 665—672 are connected to certain ones of the stages and supply a negative output signal thereon whenever the associated stage is operated. Otherwise, the output lines are normally positive. These output signals are supplied by the output lines 665—672 to FIG. 9. Output line 672, representing byte 0 is additionally supplied to FIG. 6.

One of the input lines 651—662 which is activated to operate the corresponding stage of the ring counter 650 is controlled by the negative input signal supplied on a selected one of inputs 673—684. These input terminals are all connected to the Process and Control circuitry 20 of FIG. 1 and the negative signal supplied on the one of the lines representing the number of bytes of data included in the record to be transferred between the CPU and the control unit. The signal on the selected line is gated to the ring counter by means of a positive pulse at "Go" input terminal 685. The "Go" input pulse from Process and Control circuitry 20 of FIG. 1 is discussed with respect to FIG. 2 and initiates operation of the total interlock control. The positive "Go" input signal is inverted by NOT circuit 686 and supplied on lines 687 and 688 to –AND circuits 689—701, thereby operating the one AND circuit enabled by the signal from the corresponding input 673—684. The operated one of the AND circuits supplies a positive output signal on the corresponding one of lines 651—662 to the selected stage of the ring counter 650.

The operated stage of the counter represents the number of bytes in the record to be transmitted between the CPU and the control unit. As previously discussed, each byte that is transferred therebetween is either accompanied from the control unit by, or ordered from the CPU by, a service in signal from the control unit. The CPU responds by sending a corresponding service out signal to the control unit on line 18 of FIG. 1. The received service out signal appears at input terminal 663 to Step input 664 of the ring counter 650. Each received service out thus operates the next adjacent numerically lower stage of the ring counter and terminates operation of the previously operated stage.

Hence, if the record to be transferred contains nine bytes of data, input 676 would be actuated and, when gated by AND circuit 693 to supply a positive output on line 654, stage 9 of the ring counter would be operated. When the first service out is received from the CPU at Step input 664, stage 8 of the ring counter would be operated thereby and the operation of stage 9 terminated. The counter continues to step down one stage for each service out signal received, and output signals supplied to FIG. 9 from output lines 665—672 when the corresponding stage is operated. The stepping continues until stage 0 of the ring counter is operated and the resultant negative output signal supplied on line 672 to the circuitry of FIGS. 6 and 9. The circuitry of FIG. 6 responds by supplying a positive "General Reset" signal on output line 332 therefrom to General Reset input terminal 702 of FIG. 10. This positive signal is supplied to input 703 of the ring counter and operates to maintain stage 0 of the ring counter on and enable the ring to be again set to any count. Thus, any subsequently appearing positive input signal on any of lines 651—662 will turn on the corresponding stage of the ring counter.

Referring now to FIG. 11, the circuit of interlock control circuitry 14 of FIG. 1 for controlling the Process and Control circuitry 20 for the transfer of data from the CPU 10 to the control unit 12 and to I/O device 13, the write function is illustrated.

If data is to be the signal indicating that the data to be transferred is to be transmitted from the CPU to the control unit is represented by an input pulse appearing at "Write" input signal 750 of FIG. 11. This positive signal is inverted by NOT circuit 751 and supplied to –AND circuit 752. Hence, application of the Write input signal at terminal 750 enables one of the inputs to AND circuit 752. This input signal occurs before application of the Go input pulse to the circuitry of FIG. 2 and continues until after all of the data has been properly transferred to the control unit and a new instruction is received from the CPU.

Each byte of data received from the CPU 10 is accompanied by a service out signal on line 18. If the interconnection between the CPU and the control unit is operating properly, each such service out signal will arrive during the Service Response Window. Hence, another input to AND circuit 752 is "Service Response Window" input 753 which supplies the negative signal from line 112 of FIG. 3 to the AND circuit. The service out signals from line 18 at the control unit are also supplied to "Service Out" input terminal 754 to NOT circuit 755. The NOT circuit inverts the positive service out signals and applies the same to AND circuit 752. Hence, during the write operation, the AND circuit 752 is enabled during each cycle of the clock of FIG. 12 by the negative Service Response Window input at terminal 753 and a service out signal received during that window causes operation of the AND circuit 752.

The AND circuit operates by supplying a positive output signal on "Set Bus Register" output line 756. This signal is transmitted to input-output register 16 of FIG. 1 to gate the register to receive the corresponding parallel byte of data on Bus Out cable 15 from the CPU. Hence, the input-output register receives the data and subsequently supplies the data to Process and Control circuitry 20. The data is subsequently transferred to the Write Data Register 21 where it is converted to serial data and then supplied to Input-Output Device 13.

OPERATION OF THE PREFERRED EMBODIMENT OF THE INVENTION

Referring particularly to the timing chart illustrated in FIG. 13, taken together with the illustrations in of the apparatus shown in FIGS. 1—12, an example illustrating the operation of the disclosed circuitry will be described.

Figure 13:
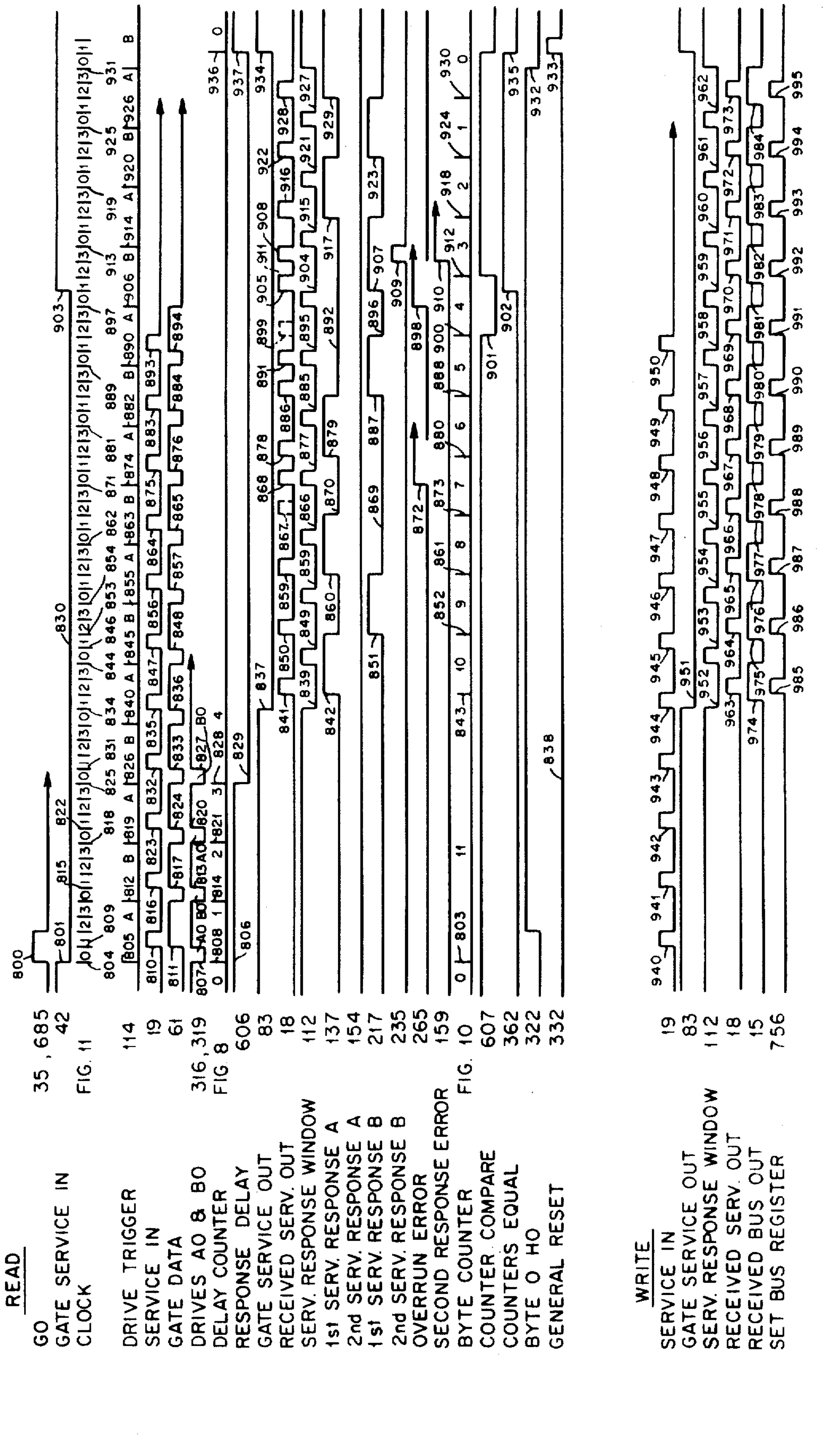
FIG. 13 comprises a waveform diagram illustrating operation of the circuitry of FIGS. 1—12.

Referring to FIG. 13, under the heading "Read" is the listing of the names of a plurality of signals, together with the numerical designations of input and/or output terminals at which the signals appear, or of the figures producing the signals, and a timing chart illustrating those signals during the operation of the described circuitry for a selected example.

In the example selected, the record to be transmitted from the CPU to the control unit is selected to comprise 11 data bytes and the round-trip response delay time for transmission of a service in to the CPU and receipt of the responsive service out from the CPU comprises 4 cycles of the clock of FIG. 12.

Either prior to or at the commencement of operation of the disclosed circuitry, a manually preset negative signal is applied to one of the input terminals 500—507 of the circuitry of FIG. 9. This signal designates the number of cycles of the clock of FIG. 12 comprising the above round-trip response delay time. In the example chosen, this delay amounts to four cycles of the clock. Hence, the negative signal is supplied at input 504. Also, prior to or at the commencement of operation of the described circuitry, a negative signal is supplied at one of the inputs 673—684 of the circuitry of FIG. 10. This signal indicates the number of bytes of data in the instant record to be transmitted from the CPU to the control unit. In the example chosen the number of bytes is 11. Hence, the negative input signal is applied to input terminal 674, thereby enabling AND circuit 690. In addition, the process and control circuitry 20 of FIG. 1 indicates to the interlock control circuitry 14 that the CPU has commanded that the next operation is a read operation. The process and control circuitry makes this indication by supplying a continuing positive signal to Read input terminal 37 of FIG. 2.

Operation of the circuitry is actually begun by application thereto of a positive Go signal from the process and control circuitry 20 of FIG. 1. The Go signal is represented by positive pulse 800 in FIG. 13. As shown in FIG. 13, this pulse appears at input terminals 35 of FIG. 1 and 685 of FIG. 10. The Go pulse at input 35 of FIG. 1, being positive, operates OR circuit 36, causing the OR circuit to change its output from positive to negative, the resultant transition 801 being shown in FIG. 13. Since the Counters Equal input signal 802 at input terminal 44 to AND circuit 40 is negative, the AND circuit is operated by the negative output of OR circuit 36, thereby latching the OR circuit 36 and AND circuit 40 so that the signal on output line 42 remains negative.

The positive Go input signal 800 is also applied to input terminal 685 of FIG. 10, where it is inverted by NOT circuit 686 and supplied to AND circuits 689—701. As stated previously, one of the inputs 673—684 to the set of AND circuits is negative. In the example chosen here, "Set 11" input terminal 674 is assumed to have been preset negative. Thus, AND circuit 690 operates upon application of the inverted Go pulse on line 688 to thereby transmit a positive signal on line 652 to operate stage 11 of the ring counter 650. Transition 803 thus shows the change of the ring counter 650 from the "0" state to the operation of stage 11.

In FIG. 2, the output 801 of OR circuit 36 is also applied to input 50 of binary trigger 51. This negative-going transition 801 operates the trigger causing it to supply a positive output on Run Clock output line 55 to FIG. 12. This positive signal appears at input terminal 27 of FIG. 12 and thereby allows the clock 26 to respond to the output of voltage controlled oscillator 25. The clock 26 responds by providing a positive clock 0 output pulse on line 28, the transition to the phase 0 state being shown by line 804 in FIG. 13. The clock will continue to step sequentially and repetitively through the four phases until the signal at input terminal 27 again becomes negative.

The phase 0 clock signal is supplied to, inter alia, input terminal 113 of FIG. 3. This signal operates drive trigger 114 to switch to the "A" state, supplying a negative signal at output 115 and a positive signal at output 116. This transition is illustrated by line 805 in FIG. 13. The outputs of the drive trigger 114 are supplied to Drive A input 300 and Drive B input 302 in FIG. 6. These inputs are supplied respectively to AND circuits 301 and 303, the negative Drive A input thereby enabling AND circuit 301. Another input to AND circuit 301 comprises the Response Delay input terminal 304, as inverted by delay circuit 305 and supplied at input line 306. The polarity of this input signal 806 is positive and, after being inverted by delay circuit 305, is applied to the AND circuit 301. The remaining input to the AND circuit comprises the phase 0 clock input at terminal 308. This positive signal is also inverted by NOT circuit 309 and supplied to the AND circuit 301, thereby operating the AND circuit. The AND circuit thus supplies a positive output on line 314, which is inverted by NOT circuit 315, to supply the negative Drive A0 output signal 807 on output line 316. For the sake of convenience, both the A0 and B0 outputs are shown on the same line in FIG. 13.

The negative A0 output pulse 807 is supplied at Drive A0 input terminal 400 of the delay counter of FIG. 8. This negative signal is inverted by NOT circuit 402 and supplied to OR circuit 403. As discussed previously, OR circuit 403 is operated, in turn operating AND circuit 413 to provide a latched negative output on Latch 1 output line 419 and a positive output on Not Latch 1 output line 423. The delay counter of FIG. 8 has thus switched from the "0" state to the 1" state. This change in state is designated by line 808 in FIG. 13.

The clock of FIG. 12 then switches to the phase 1 state, providing a positive output on line 29. This change of state is designated by line 809 in FIG. 13. This positive signal is supplied, inter alia, at input terminal 64 of FIG. 2 to NOT circuit 66. The NOT circuit inverts the signal and supplies it to AND circuit 48, thereby operating the AND circuit. The AND circuit thus supplies a positive Service In signal 810 on output line 19. At the same time, the termination of the phase 0 clock pulse at input 56 to AND circuit 39 operates the AND circuit to supply a positive signal 811 on Gate Data line 61 to input-output register 16 of FIG. 1. The Gate Data signal operates the input-output register to thereby supply the first available byte of data on bus in 17 to CPU 10. At the same time, the service in signal 810 in supplied on output line 19 to the CPU 10.

The clock of FIG. 12 continues to operate, and once again assumes the phase 0 state, supplying a positive output on line 28. This signal is again supplied to input 113 of drive trigger 114, thereby switching the trigger to state "B" wherein Drive B output 116 is negative and Drive A output 115 is positive. This change of state is illustrated by line 812 in FIG. 13.

The positive phase 0 clock pulse is also supplied at input terminal 56 to AND circuit 38 of FIG. 2. This positive pulse disables the AND circuit to thereby terminate its positive output signal 811 which appears at Gate Data output line 61.

The negative Drive B signal at output 116 of drive trigger 114 is transmitted by output line 121 to Drive B input terminal 302 of AND circuit 303 in FIG. 6. The phase 0 clock pulse is also applied to input terminal 308, and inverted by NOT circuit 309 and applied to input 313 of the AND circuit. As explained previously, input 307 thereto is also negative, thereby allowing the phase 0 clock pulse to enable AND circuit 303 to supply a positive output on line 317. This positive pulse is inverted by NOT circuit 318 and supplied on Drive B0 output line 319, as illustrated by negative pulse 813 in FIG. 13. The B0 pulse is supplied to input terminal 401 of the the delay counter of FIG. 8. As explained previously, this first B0 pulse is inverted by NOT circuit 404 and thereby disables AND circuit 413 and OR circuit 403, turning off Latch 1 so that Latch 1 output line 419 goes positive and Not Latch 1 output line 423 goes negative. The negative B0 pulse is also applied to input 405 of AND circuit 406. This signal operates the AND circuit to supply a positive output to OR circuit 426, thereby operating the OR circuit and, in conjunction with the other inputs, operates AND circuit 415. Thus, Latch 2 is operated to thereby supply a negative output on Latch 2 output line 428 and a positive output on Not Latch 2 output line 442. This change of state of the delay counter of FIG. 8 from the "1" to the "2" state is illustrated by vertical line 814 in FIG. 13.

The clock of FIG. 11 then switches from phase 0 to phase 1, as illustrated by line 815. Application of the phase 1 signal thus causes AND circuit 48 of FIG. 2 to supply positive output pulse 816 on Service In output line 19 to the CPU. Termination of the phase 0 positive input to AND circuit 39 of FIG. 2 causes the AND circuit to provide positive output pulse 817 on Gate Data output line 61.

When the clock again returns to phase 0, represented by vertical line 818, the positive output signal 817 from AND circuit 39 of FIG. 2 is terminated, binary trigger 114 of FIG. 3 changes back to the "A" state shown by vertical line 819. NOT circuit 315 of FIG. 6 supplies the negative Drive A0 output pulse 820 on output line 316 to thereby operate Latch 1 of FIG. 8, causing the delay counter of FIG. 8 to assume state "3" as shown by vertical line 821.

Upon switching to phase 1, as shown by vertical line 822, the clock of FIG. 11 causes AND circuit 48 of FIG. 2 to supply a service in pulse 823 on output line 19 to the CPU and the termination of the phase 0 input to AND circuit 39 causes the AND circuit to supply positive output 824 on output line 61 to input-output register 16 of FIG. 1. This Gate Data pulse 824 causes the input-output register to supply another byte of data on bus in 17 to the CPU.

Vertical line 825 of FIG. 13 illustrates the assumption of phase 0 by the clock of FIG. 11 on its next cycle. The phase 0 clock signal operates drive trigger 114 to switch to the "B" state, shown by line 826. This also terminates the Gate Data output pulse 824 and, together with the output of drive trigger 114, causes the circuitry of FIG. 6 to produce a negative Drive B0 output pulse 827. This pulse is supplied to input 401 of FIG. 8. This signal is inverted by NOT circuit 404 to thereby disable Latch 1. In addition, the negative pulse is applied to input 407 of AND circuit 408, thereby operating the AND circuit to provide a positive output on line 440 to AND circuit 415. This pulse disables the AND circuit and thereby turns off Latch 2. Lastly, the negative B0 pulse is supplied to input 409 of AND circuit 410, operating the AND circuit to supply a positive output on line 444 to OR circuit 445, thereby operating Latch 4. Thus, Latches 1 and 2 are disabled and Latch 4 is operated, thereby causing output lines 419, 428 and 450 to be positive and lines 423, 442 and 447 to be negative. Line 828 in FIG. 13 illustrates the assumption by delay counter of FIG. 8 of the resultant count of "4."

The listed outputs of FIG. 8 are supplied to inputs 518, 523, 528, 533, 538 and 543 of FIG. 9. As discussed previously, a negative input is supplied at "Stop at 4" input 504 to AND circuit 514. Upon the operation of Latch 4 and the disabling of Latches 1 and 2 of the delay counter of FIG. 8, input terminals 518, 523 and 543 of FIG. 9 become negative. These three inputs are connected respectively to lines 521, 526 and 544 of AND circuit 514. Since all the inputs thereto are negative, the AND circuit operates by supplying a positive signal at output 572. This signal is inverted by NOT circuit 577 and the resultant negative signal applied on line 587 to AND circuit 592. However, the other input 597 to AND circuit 592 is positive, and the AND circuit therefore does not operate. The positive output of AND circuit 514 is additionally supplied on line 582 to OR circuit 551. This signal operates the OR circuit so that its output on line 606 becomes negative as shown by signal 829, thus terminating the Response Delay Signal.

The negative signal on output line 606 of FIG. 9 is supplied to input terminal 304 of FIG. 6. This negative signal is inverted and delayed slightly more than one phase of the clock by delay circuit 305. In this manner, the negative B0 output signal 827 is not prematurely turned off. After the delay, the resultant positive signal is applied to input 306 of AND circuit 301 and to input 307 of AND circuit 303, thereby disabling both AND circuits. Therefore, the supply of Drive A0 output signals on line 316 and Drive B0 output signals on line 319 are terminated, thereby additionally terminating further operation of the delay counter of FIG. 8 and maintaining the operation of AND circuit 514 of FIG. 9.

The negative Response Delay signal is also supplied to input terminal 63 of FIG. 2. This signal is applied to one input of AND circuit 46 and also over line 73 to an input of AND circuit 72. The negative Gate Service In signal 830 of FIG. 13 is supplied from OR circuit 36 in FIG. 2 to input 45 of the AND circuit 46. The remaining input thereto comprises Clock 0 input 57. This input is positive during the phase 0 clock time, the positive signal being inverted by NOT circuit 62 and applied to the AND circuit, thereby operating the AND circuit. The resultant positive output is supplied on line 69 to OR circuit 70. OR circuit 70 and AND circuit 72 comprise a latch circuit and, since input 73 to the AND circuit is negative, the latch is operated to thereby supply a positive output on line 75 to delay circuit 76. The delay circuit inverts the applied positive signal and delays it for approximately three phases of the clock. Hence, the positive signal appearing on line 75 of phase 0 of the clock is delayed until approximately phase 3 of the clock.

In the meantime, termination of phase 0 of the clock and beginning of phase 1 thereof as illustrated by line 831, causes AND circuit 48 of FIG. 2 to transmit service in pulse 832 on line 19 and causes AND circuit 39 to transmit the Gate Data output 833 on line 61.

After approximately phase 3 of the clock, delay circuit 76 applies a continuing negative signal to input 68 of AND circuit 53. Another input to the AND circuit comprises the Gate Service In signal 830 from OR circuit 36. The last input to the AND circuit comprises the Clock 1 input 65. The next phase 1 of the clock is illustrated by line 834. This signal again causes transmission of a service in signal 835 and of Gate Data output signal 836. The positive phase 1 clock signal is also applied to input 65 of NOT circuit 67 in FIG. 2. The NOT circuit inverts this signal, supplying the resultant negative signal to AND circuit 53. The AND circuit is operated thereby and supplies a positive output on line 77 to OR circuit 78. The OR circuit 78 operates by changing its output from a positive signal to the negative signal 837 on Gate Service Out output line 83. AND circuit 79 is operated by the output of the OR circuit since the General Reset input 80 thereto is negative as illustrated by signal 838 and thereby latches the OR circuit on to maintain the Gate Service Out signal 837.

The negative output signal 837 indicates that a train of service outs from the CPU on line 18 in FIG. 1 is expected. The total delay provided by the delay counter of FIG. 8, the circuitry of FIG. 9 producing Response Delay output on line 606 and the circuitry of FIG. 2 responding to the Response Delay signal at input 63 to produce the Gate Service Out signal 837 is precisely four cycles of the clock as measured from the point in FIG. 13 designated by line 809 and by transmission of the accompanying service in signal 810 until the point designated by line 834 and by the accompanying Gate Service Out signal 837. This delay is equal to the expected round-trip delay time between transmission of the service in 810 on line 19 to the CPU and the corresponding service out received from the CPU on line 18.

The output of OR circuit 78 is applied to Gate Service Out input 100 of AND circuit 101 in FIG. 3. The other input to the AND circuit comprises Clock 0 input terminal 102. This input is positive during phase 0 of the clock but goes negative when the clock switches to phase 1 as designated by line 834 in FIG. 13. Hence, the AND circuit is operated to provide a positive output on line 103 to OR circuit 104. The clock 0 output terminal 102 is also supplied on line 108 to AND circuit 107, enabling the AND circuit upon termination of the phase 0 signal. AND circuit 107 and the OR circuit 104 comprise a latch, which is operated upon application of the signal on line 103. The latch is designated as Service Response Window latch and provides output signal 839 on output line 112 and on line 110. This signal or "window" indicates the time during which properly transmitted and received service out signals from the CPU are to be expected. A service out signal received during the window therefore has correct timing.

Drive trigger 114 is in state A, as illustrated by line 840, thereby supplying a negative signal from output 115 on line 118 to AND circuit 111, thereby enabling the AND circuit in conjunction with the Service Response Window signal. At this time, assume that a service out signal 841 is properly received on line 18 from the CPU in response to the service in signal 810 transmitted thereto.

The received service out signal 841 is supplied to Service Out input terminal 126 of FIG. 3 and inverted by NOT circuit 127. The resultant negative signal is supplied to AND circuit 111. Since a service out is properly received during the operation of the Service Response Window output 839 supplied at input 110, AND circuit 111 is operated to supply a positive output on line 130. The positive signal operates OR circuit 131 which, together with AND circuit 133 forms a latch which is operated thereby. The latched output of AND circuit 133 thus comprises a positive signal 842 on line 139 and on output line 137 to indicate that a service out was received during the Service Response Window and during Drive A time of drive trigger 114.

The received service out signal 841 is also supplied at Service Out input terminal 663 of FIG. 10. This signal is applied to the Step input 664 of the ring counter 650. This signal operates the ring counter to step from operation of stage 11 to the operation of stage 10, turning off stage 11. This operation is depicted by vertical line 843 in FIG. 13.

As the clock completes another cycle and again assumes phase 0, depicted by line 844 in FIG. 13, drive trigger 114 is switched thereby to the "B" state depicted by vertical line 845, and the positive phase 0 clock pulse is supplied to input 56 of AND circuit 39 of FIG. 2 and to input 102 for AND circuits 101 and 107 in FIG. 3. This signal thereby terminates Gate Data Output pulse 836 and also terminates operation of AND circuit 101 and AND circuit 109 in FIG. 3. The termination of the operation of those AND circuits likewise terminates operation of OR circuit 104, causing the output of the OR circuit to go positive. In this manner, the negative Service Response Window signal 839 is terminated.

At the next phase 1 of the clock depicted by line 846, service in signal 847 and Gate Data signal 848 are transmitted. The termination of the phase 0 clock signal causes the Service Response Window latch of FIG. 3 to again supply a negative output signal 849 on line 112. This signal is supplied to input terminal 200 of AND circuit 201 in FIG. 4, which is enabled by the negative Drive B input signal at terminal 202. Again, it is assumed that the CPU has properly responded to the service in signal 816 and service out 850 is received therefrom on line 18. The service out signal is applied at input 203, inverted by NOT circuit 204 and supplied to AND circuit 201. The AND circuit responds by supplying a positive output on line 205 to OR circuit 206. OR circuit 206 and AND circuit 208 comprise a latch, the latch being operated by the signal on line 205 so as to supply a positive 1st Service Response B signal 851 on line 215 and on output line 217.

The received service out signal 850 is also supplied to input terminal 663 of FIG. 10 to input 664 of the ring counter 150. This signal thereby steps the ring counter from the operation of stage 10 to the operation of stage 9, and terminates the operation of stage 10. This is illustrated by line 852 in FIG. 13.

At about the same time, the counter enters phase 2 as designated by line 853, supplying a phase 2 clock signal at input terminal 135 of FIG. 3. The signal is inverted by NOT circuit 136 and applied to AND circuit 123. The other input to the AND circuit comprises the negative Drive B output of drive trigger 114. Therefore, the inverted phase 2 clock signal operates AND circuit 123 to supply a positive signal on line 134 to AND circuit 133. This positive signal disables the AND circuit and thereby disables the latch comprising the AND circuit and OR circuit 131. The 1st Service Response A signal 842 is thereby terminated.

During the next cycle of the clock, beginning at the point designated by vertical line 854, the circuitry again operates properly in accordance with the present example. The operation includes the switching of drive trigger 114 to the "A" state 855, the transmission of service in signal 856, the transmission of a Gate Data output signal 857, the creation of the Service Response Window 858, the receipt of service out signal 859 in response to the service in signal 823, the production of 1st Service Response A signal 860, the stepping of the byte counter to the operation of stage 860, the stepping of the byte counter to the operation of stage 8 depicted by line 861 and the termination of 1st Service Response B signal 851.

The next cycle of the clock beginning with the transition to phase 0 shown by line 862 causes drive trigger 114 to switch to the "B" state shown by line 863, followed by production of service in pulse 864, Gate Data signal 865 and Service Response Window 866. The proper timing for a received service out signal on line 18 is illustrated by the phantom pulse 867. However, for the purpose of illustration, the service out is assumed to actually be received as shown by signal 868. Thus, service out signal 868 is not received during application of the Service Response Window signal 866 to AND circuit 201 of FIG. 4. The AND circuit therefore is not operated and the output from AND circuit 208 remains negative as illustrated by signal 869. At phase 2 of the clock, the clock signal applied at input terminal 135 of FIG. 3 is inverted by NOT circuit 136 to thereby operate AND circuit 123. The AND circuit thus supplies a positive signal on line 134 to AND circuit 133, thereby disabling that AND circuit and terminating 1st Service Response A output signal 860 on line 137 as shown by negative signal 870.

Referring now to FIG. 5, 1st Service Response A signal 870 at input terminal 250 has been terminated and therefore is negative as is 1st Service Response B signal 869 at input terminal 252. Therefore, OR circuit 251 is not operated and supplies a positive output on line 253. This positive signal is inverted by NOT circuit 254 and the resultant negative signal supplied on line 255 to AND circuit 256. The Gate Service Out signal 837 at input terminal 257 to the AND circuit is also negative. Therefore, at phase 0 of the following cycle of the clock, designated by line 871, the positive sampling pulse at input terminal 258 is inverted by NOT circuit 259 and thereby operates AND circuit 256. The resultant positive output is supplied on line 260 to OR circuit 261. OR circuit 261 and AND 263 comprise the Overrun Latch and are operated thereby to supply a positive Overrun Error signal on line 265. This signal is designated by waveform 872 in FIG. 13. This signal is supplied to the Process and Control circuitry 20 of FIG. 1 and remains on until the CPU 10 has been informed and orders the process and control circuitry to supply a positive Reset Error signal at input terminal 264 of FIG. 5 to disable the AND circuit 263 and thereby terminate the error signal 872.

For the purpose of continued operation of the circuitry in the example shown, the service out signal received on line 18 will now be assumed to have been the pulse 867 shown in phantom in FIG. 13. That signal again operates the byte counter of FIG. 10 to step to operation of stage 7 as shown by line 873. The following cycle of operation of the clock beginning with line 871, again normally operates drive trigger 114 to switch to the "A" state shown by line 874, transmits service in signal 875, transmits Gate Data signal 876 and produces Service Response Window 877. The normally received service out signal 878 operates 1st Service Response A circuitry of FIG. 3 to produce signal 879 and operates the byte counter of FIG. 10 to switch to operation of stage 6, illustrated by line 880.

The following cycle of the clock, beginning with phase 0, as shown by line 881, proceeds normally with operation of drive trigger 114 to the "B" stage shown by line 882, the production of a service in signal 883, the production of Gate Data signal 884 and the generation of Service Response Window 885. The properly received service out signal 886 operates the 1st Service Response B circuitry of FIG. 4 to produce signal 887 and causes the byte counter of FIG. 10 to step to the operation of stage 5, shown by line 888.

At the next cycle of the clock, beginning with phase 0 as shown by line 889, the drive trigger 114 is switched thereby to state "A" shown by line 890. During phase 0 of the clock, however, service out signal 891 is received. In FIG. 3, the phase 0 clock signal has disabled AND circuits 101 and 107 and thereby disabled OR circuit 104 so that no Service Response Window signal is applied to AND circuit 111. Hence, the applied service out signal 891 at terminal 126, which is inverted by NOT circuit 127, does not operate AND circuit 111. As a result, AND circuit 133 is likewise not operated and the 1st Service Response A output therefrom on line 137 remains negative as shown by waveform 892 in FIG. 13.

At phase 1 of the clock, service in signal 893 is created as is Gate Data signal 894 and Service Response Window 895. No service out is received during the Service Response Window 893 so that AND circuit 133 of FIG. 3 remains unoperated. At phase 2 of the clock, the positive clock signal is applied to input terminal 212 of FIG. 4 and inverted by NOT circuit 213 to thereby operate AND circuit 210. The AND circuit responds by supplying a positive signal on line 209 to AND circuit 208. This signal disables the AND circuit so that the 1st Service Response B output signal 887 on output line 217 is terminated, as shown by negative signal 896. Referring again to FIG. 5, negative signal 892 is applied at input 250 to OR circuit 251 and negative signal 896 is applied at input 252 to the OR circuit. Therefore, the OR circuit supplies a positive output on line 253 which is inverted by NOT circuit 254 and the resultant negative signals supplied over line 255 to AND circuit 256. Again, Gate Service Out signal 837 is applied at input 257 to the AND circuit. Thus, at phase 0 of the following cycle of the clock, designated by line 897, AND circuit 256 operates by supplying a positive output on line 260 to OR circuit 261. OR circuit 261 and AND circuit 263 are both operated thereby to supply a positive Overrun Error output signal 898 on output line 265 to the Process and Control circuitry 20 of FIG. 1. The control unit thereby responds as before to notify the CPU of the error and, when the CPU has been informed and so instructs the control unit, the process and control circuitry supplies a positive Reset Error signal at input 264 to disable the AND circuit and terminate error signal 898.

To continue the illustrated example, it is assumed that the service out signal 891 was in fact properly received as shown in phantom by waveform 899. Service out 899 accordingly operates the ring counter 650 of FIG. 10 to step to stage 4, shown by line 900. Upon the operation of stage 4, the ring counter supplies a negative output signal on Byte 4 output line 668. This signal is supplied to input terminal 597 of FIG. 9 to AND circuit 592. As discussed previously, AND circuit 592 has been enabled by the application of a negative signal on line 587 thereto. Thus, the negative signal at input 597 operates the AND circuit to supply a positive output on line 602 to OR circuit 556. The OR circuit responds by supplying negative Counters Compare output signal 901, illustrated in FIG. 13, on output line 607.

The Counters Compare signal 901 indicates that the number of service out signals received from the CPU 10 on line 18 of FIG. 1 is equal to the number of service ins and bytes of data transmitted to the CPU less the number of cycles of the clock comprising the round-trip cable delay between the control unit and the CPU. Therefore, the number of service ins so far transmitted to the CPU 10 on line 19 is equal to the total number of bytes of data in the record being transmitted. Therefore, the supply of service in signals is to be terminated.

Referring now to FIG. 7, the negative Counters Compare signal 901 is supplied at input terminal 354 of AND circuit 350. The Gate Service In signal 830 is supplied to input terminal 351 of the AND circuit. Hence, at phase 1 of the clock, the positive clock signal is supplied at input 352 and inverted by NOT circuit 353 for application to the AND circuit. The clock signal thereby operates the AND circuit to supply a positive output on line 355 to OR circuit 356. OR circuit 356 and AND circuit 360 comprise a Counters Equal latch and are operated thereby to supply the positive Counters Equal output signal 902 on output line 362.

This positive Counters Equal signal is supplied to input terminals 44 and 54 of FIG. 2. This signal at input terminal 54 has no effect upon binary trigger 51, which continues to supply its positive Run Clock output on line 55. The positive input 902 to AND circuit 40, however, disables AND circuit 40 which, in turn, disables OR circuit 36. Terminating the operation of OR circuit 36 thereby terminates negative Gate Service In signal 830, as shown by waveform 903. The resultant positive signal 903 thereby disables AND circuits 48 and 39, preventing transmission of any additional service in signals on line 19 or any Gate Data signals on line 61.

Due to the termination of the Gate Service In signal 830, the sole function of the subsequent phase 1 outputs of the clock is the generation of Service Response Window 904. At the immediately following phase 1 signal, the binary trigger 114 is in state "B" as illustrated by line 906. Hence, in FIG. 4, the Drive B input 202 to AND circuit 201 is enabled. The received service out, as inverted by NOT circuit 204, and the Service Response Window signal 904 thereby operate AND circuit 201. The AND circuit supplies a positive output to OR circuit 206, which causes a latching of OR circuit 206 and AND circuit 208. The resultant positive 1st Service Response B signal 907 is supplied on output line 217 and on line 215 to AND circuit 218. The Drive B input 219 is also negative thereby enabling AND circuit 218. But because of the positive service out signal at input 220 thereto, the operation of AND circuit 218 is delayed until termination of the initial service out signal 905 and is not operated thereby. The termination of signal 905 operates AND circuit 218 to supply a positive output to OR circuit 225. This signal latches OR circuit 225 and AND circuit 228 to thereby supply a negative 2nd Service Response Synch B signal on line 226 to the AND circuit 223.

During the same Service Response Window 904, in FIG. 13, a second service out 908 is received. This erroneous signal is applied at input terminal 220 to line 221 and inverted by NOT circuit 222 for application to AND circuit 223. The conjunction of negative inputs operates AND circuit 223 to supply Drive B 2nd Response Error signal 909 on output line 235 to input terminal 161 of FIG. 3. This positive signal operates OR circuit 155 and causes a latching of the OR circuit and AND circuit 157. The latched output comprises 2nd Response Error output signal 910 on line 159. This signal is supplied to Process and Control circuitry 20 of FIG. 1 and indicates that two service outs were received during a single Service Response Window, an error condition.

Again, the control unit informs the CPU 10 of the error and, after being instructed later by the CPU 10, supplies a positive Reset Error signal to input terminal 158 of AND circuit 157 in FIG. 3. The positive signal disables the AND circuit and also OR circuit 155 to thereby terminate the 2nd Response Error signal 910.

To illustrate continued operation of the circuitry in accordance with the present example, it will be assumed that the two received service outs 905 and 908 are replaced by a single properly received service out signal 911 shown in phantom. This properly received service out signal steps the byte counter of FIG. 10 from the operation of Stage 4 to the operation of Stage 3. This step terminates the negative output on line 668 to the Byte 4 input terminal 597 of FIG. 9. Hence, AND circuit 592 is disabled and terminates the positive output on line 602 to OR circuit 556. The OR circuit thereby terminates its negative Counters Compare output signal 901 on output line 607. This termination has no effect on AND circuit 350, however, since it was already disabled by the termination of the earlier phase 1 clock signal. The positive output signal 902 on line 362 is not effected because and circuit 360 continues to latch OR circuit 356.

At the next cycle of the clock, illustrated by line 913, the binary trigger is switched to state "A," illustrated by line 914, in determination of the phase 0 signal generates another Service Response Window 915. The received proper service out signal 916 causes production of 1st Service Response A signal 917 and causes the byte counter of FIG. 10 to step from stage 3 to the operation of stage 2, shown by line 918. Likewise, the next cycle of the clock originating at line 919 switches drive trigger 114 to state "B" shown by line 20 and establishes Service Response Window 921. The properly received service out signal 922 generates 1st Service Response B signal 923 and steps the byte counter at FIG. 10 to the operation of stage 1 as shown by line 924.

Next, the following cycle of the clock originating with line 925 switches drive trigger 114 to state "A" shown by line 926 and termination of the phase 0 signal generates Service Response Window 927. The next received service out signal 928 generates 1st Service Response A signal 929 and steps ring counter 650 of FIG. 10 from the operation of stage 1 to the operation of stage 0. Operation of stage 0 supplies a negative Byte 0 signal on output line 672 to input 554 of FIG. 9 and input 320 of FIG. 6. The input signal at terminal 554 of FIG. 9 has no effect upon AND circuit 553 due to the positive signal on line 552 thereto.

The negative signal at input 320 of FIG. 6, however, enables AND circuit 311 to respond to the subsequently appearing phase 0 clock signal designated by line 931. The positive phase 0 signal at input terminal 308 is inverted by NOT circuit 309 and applied at input 310 to the AND circuit 311. AND circuit 311 is operated thereby to supply a positive output on line 321 to OR circuit 322. OR circuit 322 and AND circuit 325 comprise a latch. The other input to AND circuit 325 is the phase 3 clock input at terminal 326. Since this input is negative, the AND circuit is operated and latches OR circuit 322. The latch thus supplies Byte 0 HO signal 932 on output line 323 to FIG. 2 and on line 328 to AND circuit 329. At FIG. 2, the signal is applied to input terminal 60 and has no additional effect on the AND circuit 39 which is already disabled by the positive signal at input 49 thereto.

The latched negative input to AND circuit 329 on line 328 enables that AND circuit so that at the following phase 1 of the clock, the positive signal applied at input 330 is inverted by NOT circuit 331 to operate AND circuit 329. The AND circuit thereby supplies a positive General Reset signal 933 on output line 332 to input terminal 80 of FIG. 2, input terminal 361 of FIG. 7, input terminal 411 of FIG. 8 and input terminal 702 of FIG. 10.

In FIG. 2, the General Reset signal 933 appearing at input 80 to AND circuit 79 disables the AND circuit which, in turn, disables OR circuit 78. Thus, the Gate Service Out signal 837 is terminated, as shown by waveform 934. Termination of this signal prevents the operation of the circuitry of FIGS. 3 and 4 and, in effect, instructs that no further service out signals are to be expected.

The General Reset signal 933 is supplied to input 361 of FIG. 7 and disables AND circuit 360 which, in turn, disables OR circuit 356. The disabling of those circuits causes the Counters Equal output signal on line 362 to be terminated, shown by waveform 935. This signal is supplied to input terminal 44 of FIG. 2 and, by going negative, thereby enables AND circuit 40 to respond to the operation of OR circuit 36 to any subsequent Go signal received at input terminal 35 from Process and Control circuitry 20 of FIG. 1.

Termination of the Counters Equal signal as shown by waveform 935 is supplied at output 362 to inputs 44 and 54 of FIG. 2. At input 44 the negative signal is applied to AND circuit 40 to thereby enable the AND circuit to respond to the next Go input signal to then allow the operation of the Gate Service In latch comprising OR circuit 36 and AND circuit 40. The negative going signal of waveform 935 is also applied at input 54 to binary trigger 51 and operates the trigger to thereby change state. The trigger thus terminates the positive Run Clock output on line 55 to FIG. 12. Termination of this positive signal at input 27 of FIG. 12 thereby stops further operation of the clock and holds the clock in condition to begin phase 0 immediately after the Run Clock input 27 becomes positive.

The General Reset signal 933 is also applied to input terminal 411 of FIG. 8 and supplied on line 412 to AND circuit 413, input 414 of AND circuit 415 and input 416 of AND circuit 417. This signal thereby disables any of the AND circuits which happen to be operated and similarly disables any of the associated OR circuits which therewith comprises a latch. In the instant example, only Latch 4 is operated and thereby disabled by the General Reset signal 933. With all the latches disabled, the delay counter comprising FIG. 8 is thereby returned to the "0" state illustrated by line 936. The delay counter is thus placed in condition to again count to the desired delay time for a subsequently transferred record.

The resetting of the delay counter of FIG. 8 to 0 by General Reset pulse 933 terminates the negative Latch 4 signal on output line 447 to input terminal 543 of FIG. 9. That termination causes input 544 to AND circuit 514 to go positive, thereby disabling the AND circuit. Being so disabled, output 572 of the AND circuit goes negative, the negative signal being supplied on line 582 to OR circuit 551. Since none of the other inputs to the OR circuit is positive, OR circuit 551 is disabled, terminating Response Delay output signal 829 on output line 606. This is illustrated by waveform 937. The resultant positive signal is applied to input 63 of FIG. 2 and input 304 of FIG. 6. The signal in input 63 of FIG. 2 is applied to AND circuit 46 and to AND circuit 72 thereby disabling both AND circuits and thereby disabling the latch comprising OR circuit 70 and AND circuit 72. The circuitry thus will prevent operation of Gate Service Out latch comprising OR circuit 78 and AND circuit 79 until the Response Delay signal again goes negative. In FIG. 6, the positive signal at input 32 is inverted and delayed by delay circuit 305 and supplied to AND circuits 301 and 303, thereby enabling both AND circuits to operate upon application of the next phase 0 clock signal.

The General Reset signal 933 as applied to input terminal 702 of FIG. 10 operates the Reset input 703 to the ring counter 650. This signal assures that the stage 0 of the counter remains operated to supply the negative output on line 672 and enables the counter to be set to the operation of any desired stage upon application of a positive signal thereto on one of the input lines 651—662. The counter is thereby enabled to be set to the number of bytes of any subsequently transferred record.

Thus, the circuitry of FIGS. 1—10 and 12 has operated in accordance with the waveforms shown in FIG. 13 to supply service in signals on line 19 and to gate each byte of data of the record to be transferred, both to the CPU 10, counted out the round-trip delay to be expected for the receipt of the first corresponding service out from the CPU 10, counted down to terminate the transmission of service ins to the CPU after all of the bytes of data comprising the record have been transmitted, checked the timing of the received service outs and signalled any errors, and counted the total number of service outs received to be sure that that number compares with the number of service in signals transmitted, thereby assuring that the entire record was properly received by the CPU.

The write operation is basically the same as the read operation except that the record to be transferred is transferred from the CPU 10 to the control unit, AND circuit 39 of FIG. 2 is disabled due to the absence of the positive Read signal at input terminal 37 thereto, and AND circuit 752 of FIG. 11 is operated instead as a result of the application of a positive Write input signal at terminal 750.

Upon application of the Go input signal, the remainder of the circuitry of FIGS. 1—12 operates as before to supply a series of service in signals 940—950, as shown in FIG. 13, on Service In output line 19 from AND circuit 48 in FIG. 2. The AND circuit 39 is disabled, however, and no accompanying Gate Data output signals are supplied. After the predetermined delay, Gate Service Out signal 951 is supplied on line 83 from OR circuit 78 of FIG. 2. As before, this negative signal is supplied to input 100 of FIG. 3 to AND circuit 101. The AND circuit is thereby operated by a negative signal at input terminal 102 which occurs upon termination of the positive phase 0 clock pulse thereat. Such operation of the AND circuit causes a positive output to be supplied on line 103 to OR circuit 104. The OR circuit 104 and AND circuit 107 comprise a latch, AND circuit 107 similarly being enabled by the negative input on line 108 from terminal 102. Therefore, OR circuit 104 supplies a series of Service Response Window signals 952—962 until ring counter 650 of FIG. 10 provides an output on Byte 0 output 672.

After the delay defined by Gate Service Out signal 851, service out signals 963—973 and bytes of data illustrated by signals 974—984, respectively, on line 18 and cable 15, are received.

Referring to FIG. 11, the positive write signal at input terminal 750 is inverted by NOT circuit 751 and applied to AND circuit 752. The series of negative Service Response Window signals 952—962 are applied at input terminal 753 to the AND circuit, thereby enabling the AND circuit for the duration of each of the window signals. During the presence of the Service Response Window signals, the received service out signals 963—973 are applied at input terminal 754. These positive signals are inverted by NOT circuit 755 and supplied to AND circuit 752, thereby operating the AND circuit. Thus, at each of the correctly received service out signals, AND circuit 752 supplies a Set Bus Register signal 985—995 to the input-output register 16 of FIG. 1. Each of these signals operates the register to receive and store the corresponding parallel byte of data 974—984 supplied thereto on cable 15. After receipt of the byte of data, the input-output register supplies each byte of data to Process and Control circuitry 20.

While the invention has been particularly shown and described with reference to a preferred embodiment thereof, it will be understood by those skilled in the art that various changes in the form and details may be made therein without departing from the spirit and scope of the invention.

What I claim is:

1. In apparatus for transferring data in a string of blocks between first and second data transfer means across a medium, said apparatus including first means at said first data transfer means for separately transmitting a first signal corresponding to each block of data transferred in said string, and second means at said second data transfer means for responding to each received said first signal and to the transfer of a block of data corresponding to said first signal to separately transmit a second signal, the improvement thereto for transfer of said data across a medium having a significant data transfer time as compared to the data transfer rate thereof, comprising:

delay means responsive to the initiation of said transmission of said first signals to generate a signal indicative of the termination of a predetermined time delay equal to the round-trip time between transmission at said first data transfer means of a first signal and the receipt thereat of the corresponding second signal;

timing means responsive to said signal indicative of the termination of said predetermined time delay for checking the receipt of said second signals at said first data transfer means at said predetermined delay time subsequent to transmission of said corresponding first signals and generating at least one error signal upon detection of an error in said receipt; and accounting means responsive to said second signals as received at said first data transfer means for counting the number of said second signals received for said string.

2. The apparatus of claim 1 wherein:

said accounting means additionally includes means for receiving a designation of the number of said blocks of data comprising said string, said accounting means being responsive to said designation for checking therewith said number of said second signals received.

3. The apparatus of claim 2 additionally including:

control means for terminating operation of said first means upon the number of said transmitted first signals equaling said designated number.

4. The apparatus of claim 2 wherein:

said timing means includes window means responsive to said signal indicative of the termination of the predetermined time delay for dividing the time subsequent to said termination of said predetermined delay into a plurality of intervals and checking means for checking the receipt of said second signals as received at said first data transfer means with respect to said intervals to insure that no more than one of said second signals is received during each of said intervals.

5. The apparatus of claim 4 wherein:

said accounting means supplies an output signal upon said number of said received second signals equaling said designated number; and, in said timing means;

said window means is additionally responsive to said output signal of said accounting means to terminate production of said intervals; and said checking means is arranged to check the timing of said second signals as received at said first data transfer means with respect to said intervals supplied by said window means to check for the proper receipt of a single one of said second signals during each of said intervals.

6. The apparatus of claim 5, wherein, in said timing means thereof:

said checking means additionally supplies a first error signal upon said check detecting the receipt of no said second signal during one of said supplied intervals, and supplies a second error signal upon said check detecting the receipt of more than one of said second signals during one of said supplied intervals.

7. The apparatus of claim 5 additionally including:

control means for terminating operation of said first means upon the number of said transmitted first signals equaling said designated number.

8. The apparatus of claim 7 wherein:

said delay means additionally includes means for supplying a delay output signal representing the time value of said predetermined delay;

said accounting means additionally includes accumulator means for accumulating the number of said second signals received for said string as each said signal is received and for supplying accumulator output signals representative of said accumulated number over at least a predetermined range of said numbers; and said control means comprises means responsive to said delay output signal and said accumulator output signals for terminating operation of said first means upon said signals indicating that said number of said transmitted first signals equals said designated number received at said accounting means.

9. The apparatus of claim 8 wherein, in said timing means thereof:

said checking means additionally supplies a first error signal upon said check detecting the receipt of no said second signal during one of said supplied intervals, and supplies a second error signal upon said check detecting the receipt of more than one of said second signals during one of said supplied intervals.